(12) United States Patent
Frost

(10) Patent No.: US 8,054,865 B1
(45) Date of Patent: Nov. 8, 2011

(54) METHODS AND APPARATUS FOR MASKING AND SECURING COMMUNICATIONS TRANSMISSIONS

(76) Inventor: Edward G. Frost, Poolesville, MD (US)

( * ) Notice: Subject to any disclaimer, the term of this patent is extended or adjusted under 35 U.S.C. 154(b) by 0 days.

(21) Appl. No.: 12/607,642

(22) Filed: Oct. 28, 2009

Related U.S. Application Data

(63) Continuation of application No. 11/434,510, filed on May 16, 2006, now Pat. No. 7,949,032.

(60) Provisional application No. 60/681,009, filed on May 16, 2005.

(51) Int. Cl.
*H04B 1/00* (2006.01)

(52) U.S. Cl. ........ 375/140; 375/130; 375/132; 375/134; 375/141; 375/147; 375/148; 375/149; 375/150; 375/295; 375/362; 375/364; 375/366; 375/367

(58) Field of Classification Search .................. 375/130, 375/141–147
See application file for complete search history.

(56) References Cited

U.S. PATENT DOCUMENTS

| | | | | |
|---|---|---|---|---|
| 4,001,716 A | * | 1/1977 | Swanson et al. | 331/48 |
| 5,121,407 A | * | 6/1992 | Partyka et al. | 375/141 |
| 5,222,100 A | * | 6/1993 | Lundquist et al. | 375/149 |
| 5,239,555 A | * | 8/1993 | Konig | 375/136 |
| 5,339,331 A | * | 8/1994 | Beauchamp et al. | 375/137 |
| 5,363,401 A | * | 11/1994 | Lucas et al. | 375/131 |
| 5,875,218 A | * | 2/1999 | Barham et al. | 375/376 |
| 6,567,486 B1 | | 5/2003 | Gordon et al. | |
| 6,628,675 B1 | | 9/2003 | Neufeld | |
| 6,639,939 B1 | * | 10/2003 | Naden et al. | 375/140 |
| 6,785,321 B1 | | 8/2004 | Yang et al. | |
| 7,054,628 B2 | * | 5/2006 | Holcman et al. | 455/432.1 |
| 7,313,164 B1 | | 12/2007 | Wilson et al. | |
| 7,558,356 B2 | | 7/2009 | Pollman et al. | |
| 2001/0038674 A1 | * | 11/2001 | Trans | 375/355 |
| 2002/0193945 A1 | | 12/2002 | Tan et al. | |
| 2004/0013170 A1 | * | 1/2004 | Fitzrandolph | 375/147 |
| 2004/0062299 A1 | | 4/2004 | McDonough et al. | |
| 2004/0233874 A1 | | 11/2004 | Baker | |
| 2005/0123025 A1 | * | 6/2005 | Sorrells et al. | 375/130 |
| 2005/0207477 A1 | * | 9/2005 | Monsen | 375/147 |
| 2006/0072586 A1 | * | 4/2006 | Callaway et al. | 370/395.62 |
| 2006/0159260 A1 | * | 7/2006 | Pereira et al. | 380/44 |
| 2006/0176938 A1 | * | 8/2006 | Tiedemann, Jr. | 375/147 |
| 2007/0096715 A1 | * | 5/2007 | Joy et al. | 324/76.53 |

* cited by examiner

*Primary Examiner* — Khanh C Tran
*Assistant Examiner* — Eboni Hughes
(74) *Attorney, Agent, or Firm* — Edell, Shapiro & Finnan, LLC

(57) ABSTRACT

A secure information transmission system includes one or more transmitters and one or more receivers. The transmission waveform employed includes highly randomized, independent stochastic processes, and is secured as a separate entity from the information it carries. The signal, using novel modulation methodology reducing impulse responses, has a paucity of spectral information and may be detected, acquired and demodulated only by communicants generating the necessary receiving algorithm coefficients. The physical area of signal reception is restricted to that of each intended communicant, reception areas following movements of mobile communicants. A unique instant in time is used as basis for communications keys to the securing algorithms dynamically generated on a one-time basis and never exchanged or stored by communicants. Technology is applicable to both fixed and mobile communications and may be applied to communications systems using wireless, fiber-optic, copper, acoustic and any other man-made or naturally occurring transmission media.

19 Claims, 23 Drawing Sheets

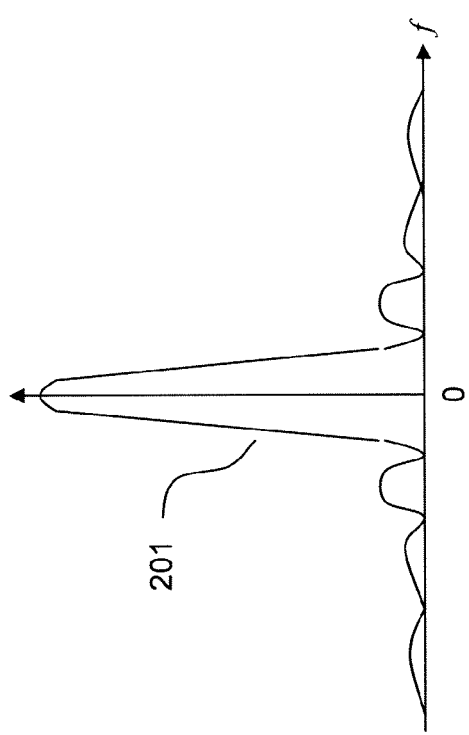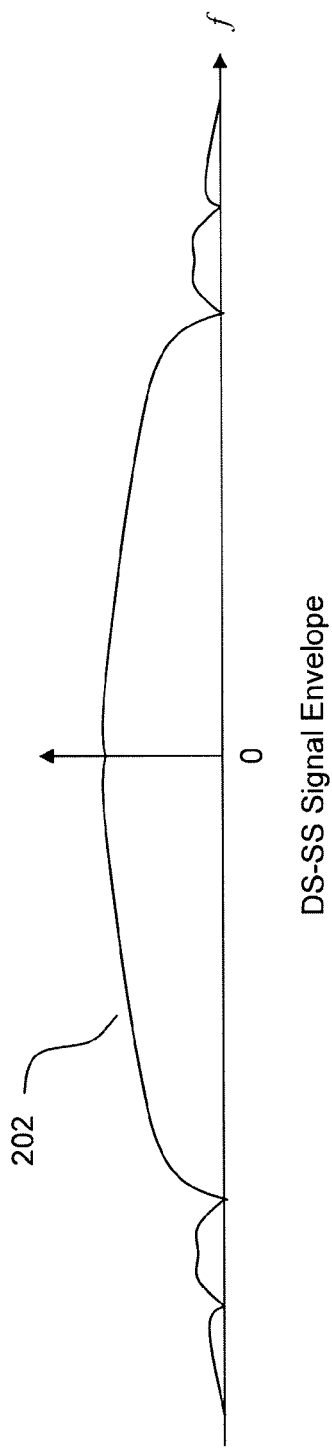
Fig. 2

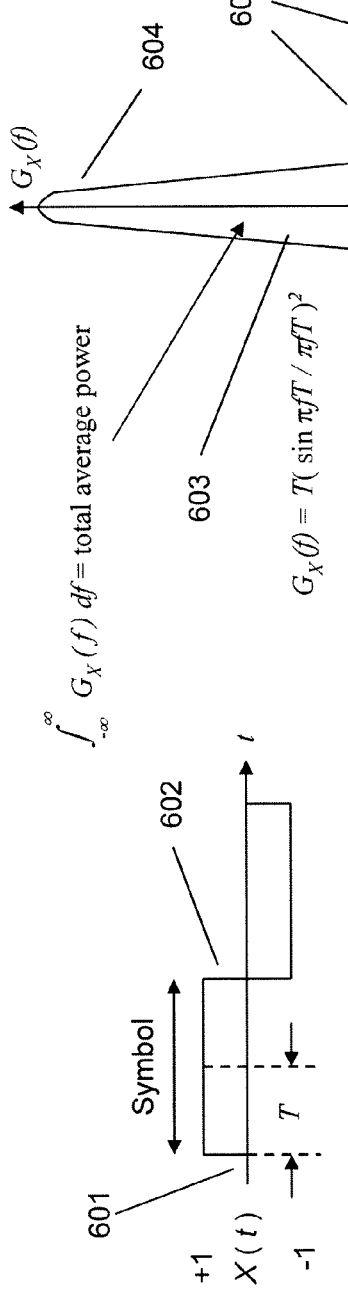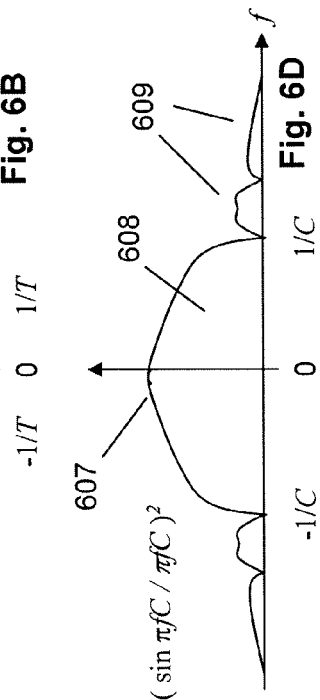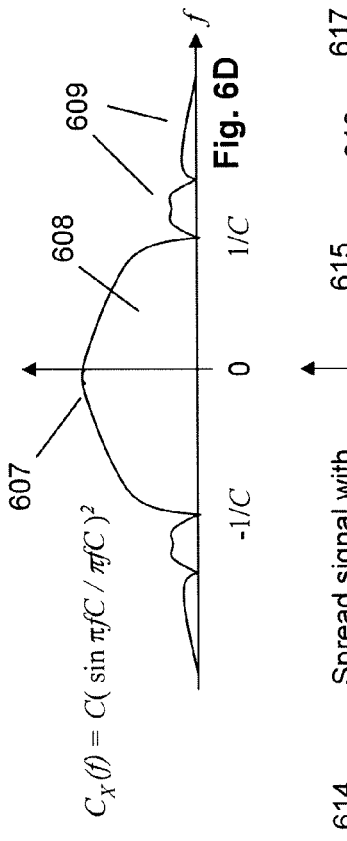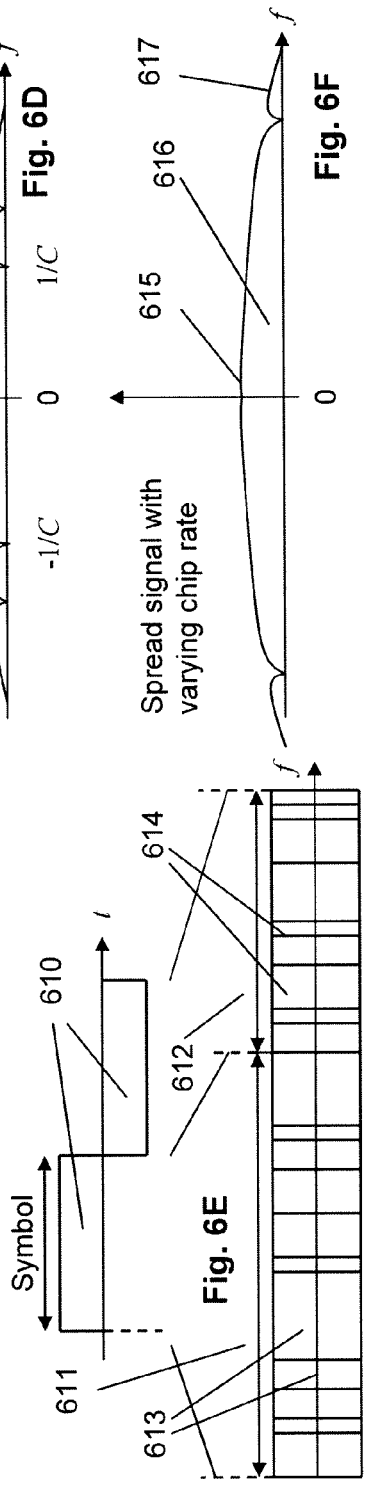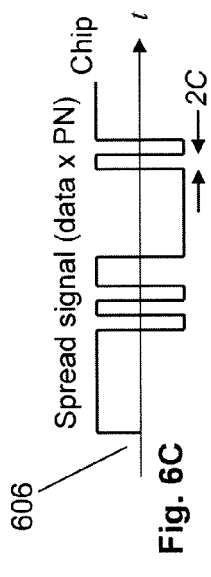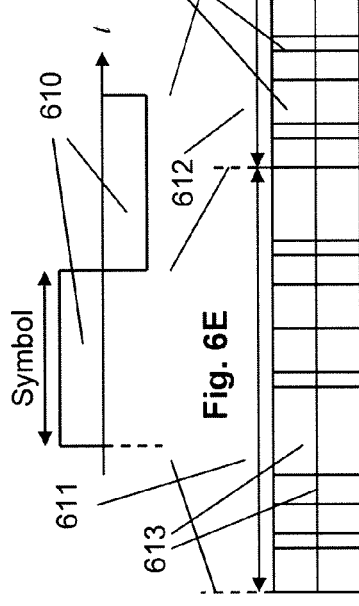
Fig. 6

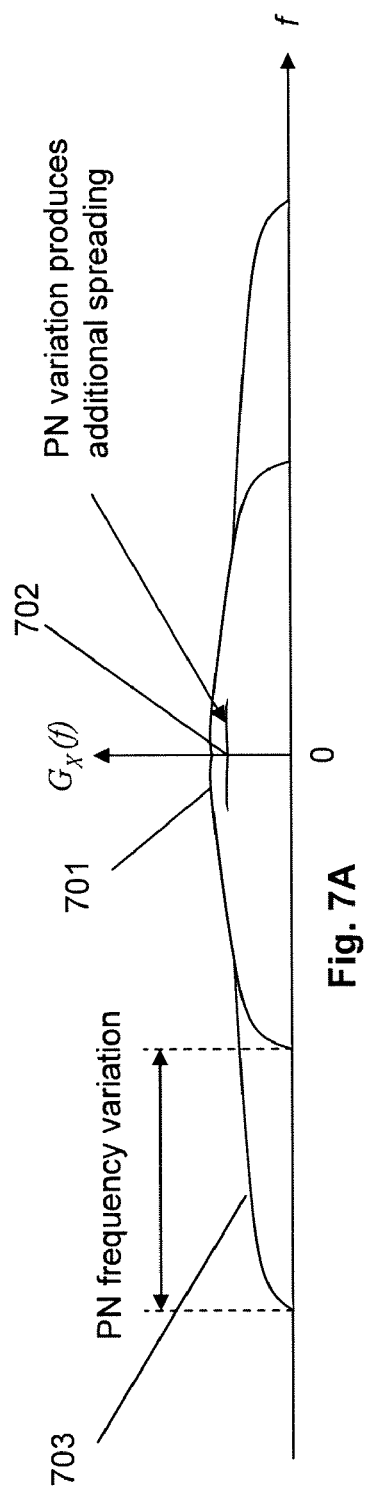
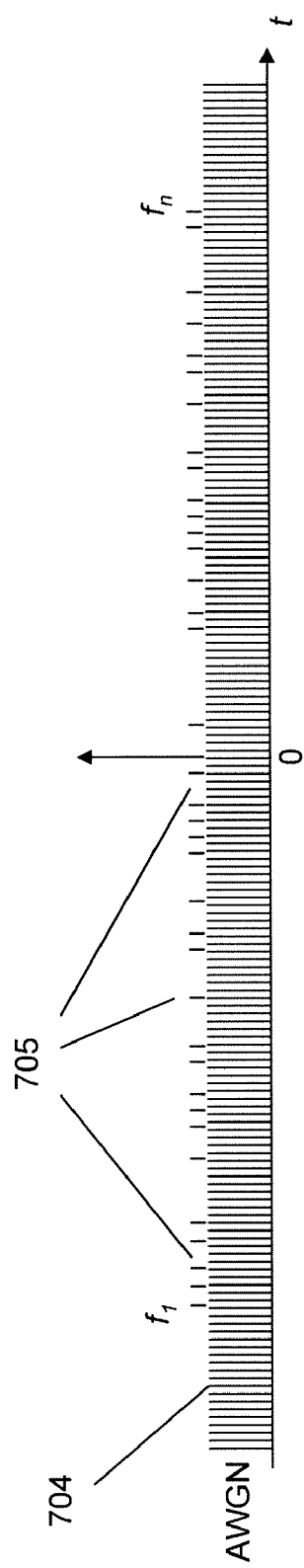
Fig. 7

METHODS AND APPARATUS FOR MASKING AND SECURING COMMUNICATIONS TRANSMISSIONS

CROSS REFERENCE TO RELATED APPLICATIONS

This application is a continuation of pending U.S. patent application Ser. No. 11/434,510 filed May 16, 2006, which claims priority under 35 U.S.C. §119(e) to U.S. Provisional Patent Application No. 60/681,009, entitled "Method of Masking and Securing Communications Transmissions," filed May 16, 2005. This provisional application is hereby incorporated herein by reference in its entirety.

FIELD OF THE INVENTION

The invention relates to the transmission of information by electromagnetic, optical and, or acoustical means, and more particularly to the security of the emission and inherently any and all information it may transport.

BACKGROUND

Information exchange is conventionally protected by encryption of the message itself. The carrier itself is most often left unprotected for all to see, on the assumption that the information is rendered safe from extraction by unauthorized interceptors. Current advances in computer technology and processing power continue to drastically shorten the time required to decrypt all but the most complex encoding, such that only time-sensitive messages with no enduring value will be safe. Complex information encryption schemes typically increase overhead, slowing message transmission. Conventionally, encryption keys must be exchanged by communicants, thus rendering the encryption more vulnerable than ever. Furthermore, the knowledge that messages are being transmitted and, or exchanged is often of value and where radio is used as the transmission medium, the radio signature itself provides a wealth of location, traffic, and source information. Such signals are easily intercepted and jammed, if desired, or used for radio location to be exploited in other ways.

SUMMARY

The invention is based on a combination of the following well known mathematical and physical principles:

1. Auto Correlation of White Gaussian Noise

The autocorrelation of white Gaussian noise (WGN) is given by the inverse Fourier transform of the noise power spectral density WGN(f):

$$Ra_{WGN}(\tau) = \int_{-\infty}^{\infty} WGN(t) \cdot WGN(t+\tau)\,dt = F^{-1}\{G_{WGN}(f)\} = (N_0/2)\delta(t)$$

The auto-correlation function is:

$Ra_{WGN}(\tau)$ is 0 for $\tau \neq 0$

Any two different samples of WGN, regardless of their close proximity will fail to correlate due to the truly random nature of WGN $G_{GWN}(f)=N_0/2$ Watts/Hertz Cross correlation is impractical, because it is impossible to generate a reference.

2. Central Limit Theorem

The probability distribution of the sum of j statistically independent random variables approaches Gaussian distribution as $j \to \infty$, no matter what the individual distribution functions may be.

The probability density function (PDF) of $W=X+Y$ is:

$$f_W(w) = \int_{-\infty}^{\infty} fx(w-y)fy(y)\,dy = \int_{-\infty}^{\infty} fx(x)fy(w-x)\,dx$$

hence:

$$P_w(w) = \sum_{k=-\infty}^{\infty} Px(k)Py(w-k)$$

thus:

$$f_w(w) = f_x(x) \otimes f_y(y)$$

It follows therefore that the PDF of $w = x_1 + x_2 \ldots x_n$ is:

$$f_w(w) = f_{x1}(x_1) \otimes f_{x2}(x_2) \otimes \ldots \otimes f_{xn}(x_n)$$

The product of 'n' unrelated pseudo-random stochastic processes (Pn) greatly decreases any deterministic aspects of the signal.

When 'n' sets of independently random variables are used in unison, the number of possible combinations and permutations of events in the resulting distribution rapidly becomes extremely large.

3. WGN Variance

WGN is an idealized process having a two sided power spectral density equal to a constant $N_0/2$ for all frequencies from $-\infty$ to $\infty$. The noise power variance, as noise has a zero mean, is:

$$\sigma^2 = \text{var}[n(t)] \int_{-\infty}^{N} (N_0/2)\,df = \infty$$

The variance for filtered WGN is finite. Correlated with one of a set of orthonormal functions, the variance of the correlator output is:

$$\sigma^2 = \text{var}(n_j) = E\left\{\left[\int_{-\infty}^{\infty} n(t)\psi_j(t)\,dt\right]^2\right\} = N_0/2$$

The secure waveform plus noise produces a totally noise-like correlator output, in the absence of a synchronized signal reference.

4. Uncertainty Principle of Information

In accordance with the "Uncertainty Principle of Information," a signal observed over a limited time interval, or window, has limited spectral definition because "the Fourier spectrum of a wave observed over a finite interval or window, is the convolution of the true spectrum of the wave with the Fourier transform of the window itself." The window $T_w$ observed in FIG. 3a has the familiar sin(x)/x from of the Fourier transform shown in FIG. 3b $1/T_w$, the shorter duration window, shown in FIG. 3c transforms to a broader peak as seen in FIG. 3d, $\Delta f=1/T_w$. Spectral windows containing relatively few cycles contain little spectral information, since $\Delta f/f_0 \approx 1$.

The invention provides numerous advantages including, but not limited to the following:

Renders signal virtually invisible to all except the intended correspondents.
Secures carrier as a discrete element, as opposed to the information it carries.
Signal has characteristics, blends with and becomes part of the ambient AWGN.
Difficult to detect.
Unauthorized acquisition extremely difficult.
Minimizes radio signature.
Uses novel modulation scheme greatly reducing impulse responses.
Restricts area of signal reception to that of the intended receiver.
Signal reception area may be restricted at will for individual network elements.
Permits users to determine relative positions of other network elements.
No masking algorithm keys transmitted or exchanged.
Unique key allocated to each communication.
Keys may be instantly changed at will.
Reverse engineering will not reveal the keys.
Does not interfere with or limit the use of information and, or protocol encryption, in any way.
No transmission overhead.
Does not interfere with transmission protocols in any way.
Signals highly orthogonal and, or having very low level cross correlation characteristics.
Enhances spectrum and bandwidth efficiency.
Permits use of physically co-located wireless systems using same frequency.
Highly impervious to jamming and interference.
Applicable to both fixed and mobile communications.
May be used to overlay and secure networks and systems employing IEEE Standard 802.11.
May be used to secure CDMA systems.
May be applied to communications systems using wireless, free-space optical, fiber optics, copper, acoustical and other man-made or natural transmission media.
Uses novel phase shift keying modulation methodology resulting in drastically reduced impulse response.
Invention embodiment may be realized using inexpensive hardware.
Embodiment may use commercial/industrial grade master timing oscillators.
Embodiment may be realized using commercial off-the-shelf (COTS) components including field programmable gate arrays (FPGA's), no proprietary components are necessary.

BRIEF DESCRIPTION OF THE DRAWINGS

FIG. 2 illustrates a spectral comparison of a peaked signal and a conventional DS-SS signal.

FIGS. 6a-6f show the spectral results of two conventional digitally modulated radio signals, peaked signal and DS-SS, and the RF signal envelope resulting from an exemplary embodiment of the invention.

FIG. 7a shows a more detailed view of the example in FIG. 6F. FIG. 7b shows spikes resulting from the chip-clock frequency change impulse response occurring at random intervals.

DETAILED DESCRIPTION

Embodiments of the invention are described below in the context of direct sequence spread spectrum (DS-SS) radio equipment and systems. However, it will be readily apparent to those well versed in the art, that the present invention and embodiment details described herein are applicable to virtually any type of information transmission systems using, but not limited to, wireless, free-space optical, fiber optics, copper, acoustical and other transmission media. Thus the present invention shall not be construed as limited in any way to specific examples provided herein.

Conventional DS-SS radio transmissions, while lower in instantaneous spectral power density than equivalent peaked signal transmissions and often immersed in the AWGN, are still easily detectable by virtue of the additive characteristic of white Gaussian noise showing increased power spectral density in the signal's location coupled with deterministic and cyclostationary features of the signal. These same features enable a would-be interceptor to gather and assemble information sufficient to determine the parameters of the signal and location of the emitter, thus permitting signal acquisition and, or effective jamming. Furthermore, in conventional communications it is necessary for encryption keys used to establish pseudo-random noise, PN, sequences and other variable parameters to be exchanged over the air, or stored in memory in the equipment.

The present invention establishes the necessary unique signal parameter algorithm coefficients without exchange of keys and significantly reduces or eliminates each of the deterministic and cyclostationary features replacing them by a combination of non-repetitive, unrelated, dynamically programmable stochastic processes. More specifically it creates a unique randomly varying waveform for each transmission, thereby increasing the difficulty of signal detection, unauthorized acquisition and exploitation.

The main deterministic and cyclostationary features of a conventional DS-SS are:

| | | |
|---|---|---|
| 1) | Carrier | |
| | a) | Constant spectral profile |
| | b) | Strictly band limited |
| | c) | Band defined |
| | d) | Well defined signature |
| 2) | Data Symbol Rate | |
| | a) | Predetermined unvarying rate, repetitive symbol duration |
| 3) | Chip Rate | |
| | a) | Predetermined unvarying rate. |
| | b) | PN symbols create cyclostationary modulation features in combination with deterministic data symbol rate. |
| 4) | PN - Pseudo-Random-Noise Spreading Code | |
| | a) | The PN sequence becomes repetitive in most applications |
| | b) | Easily detected. |
| | c) | Sequence can be compiled by an unauthorized interceptor. |

All the foregoing features facilitate compilation of information, based on which, it is possible to determine the transmission signal parameters thereby enabling its acquisition.

Figure 1:
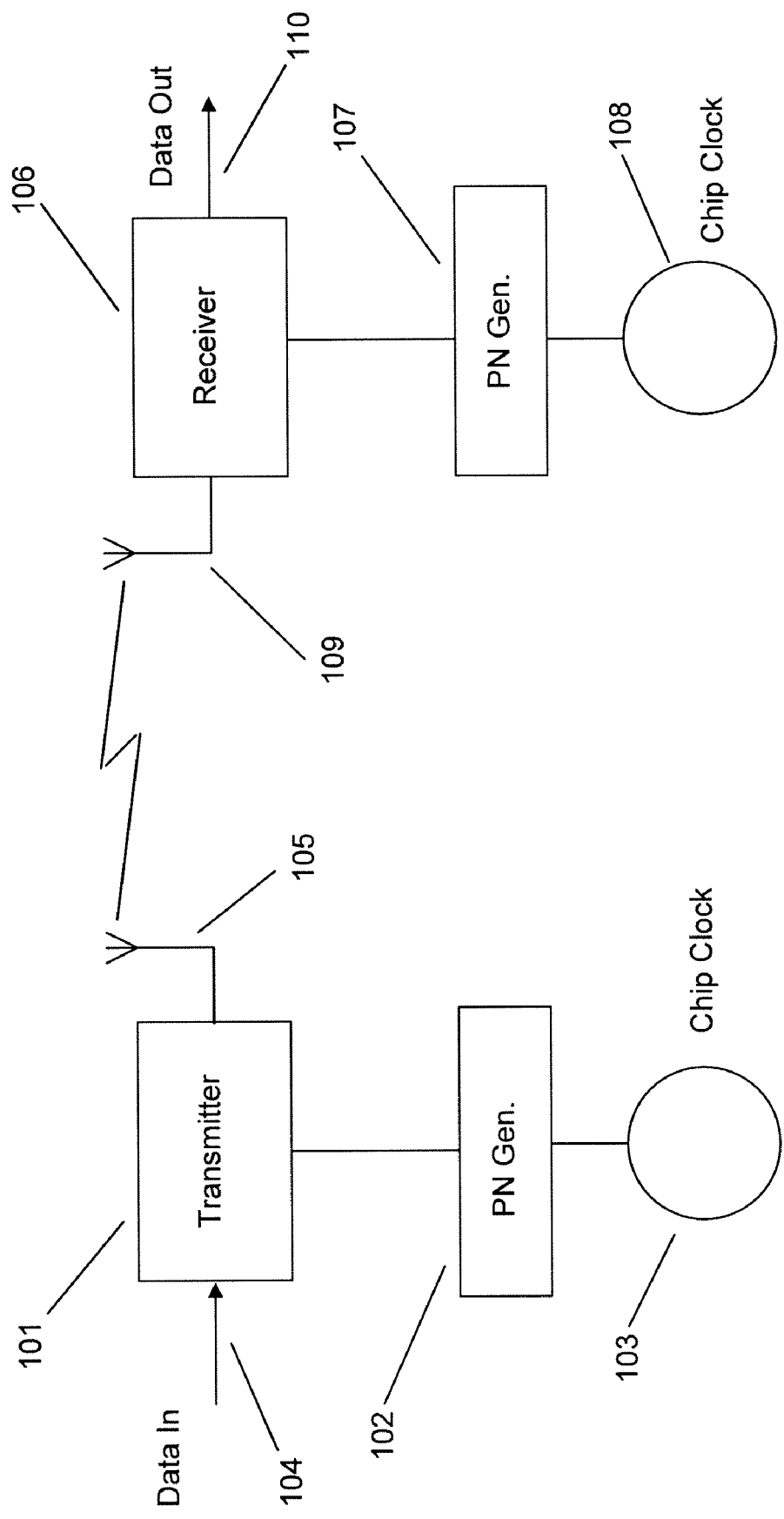
FIG. 1 is a simplified diagram of a conventional DS-SS radio link.

FIG. 1 is a simplified diagram of a conventional DS-SS radio link comprising a transmitter 101 and a receiver 106. The data input 104 modulates the transmitter carrier frequency, which in turn is further modulated, to spread the signal, by a pseudo-random noise sequence 102, clocked at a constant frequency by a chip clock 103, operating at a higher periodic rate than that of the data input 104. The resulting conventional spread signal is transmitted to the receiver in which the signal is de-spread and the data 110, retrieved by a reversal of the transmit process using well established methods. A spectral comparison of a peaked signal 201, and a conventional DS-SS signal 202, is shown in FIG. 2.

Figure 3:
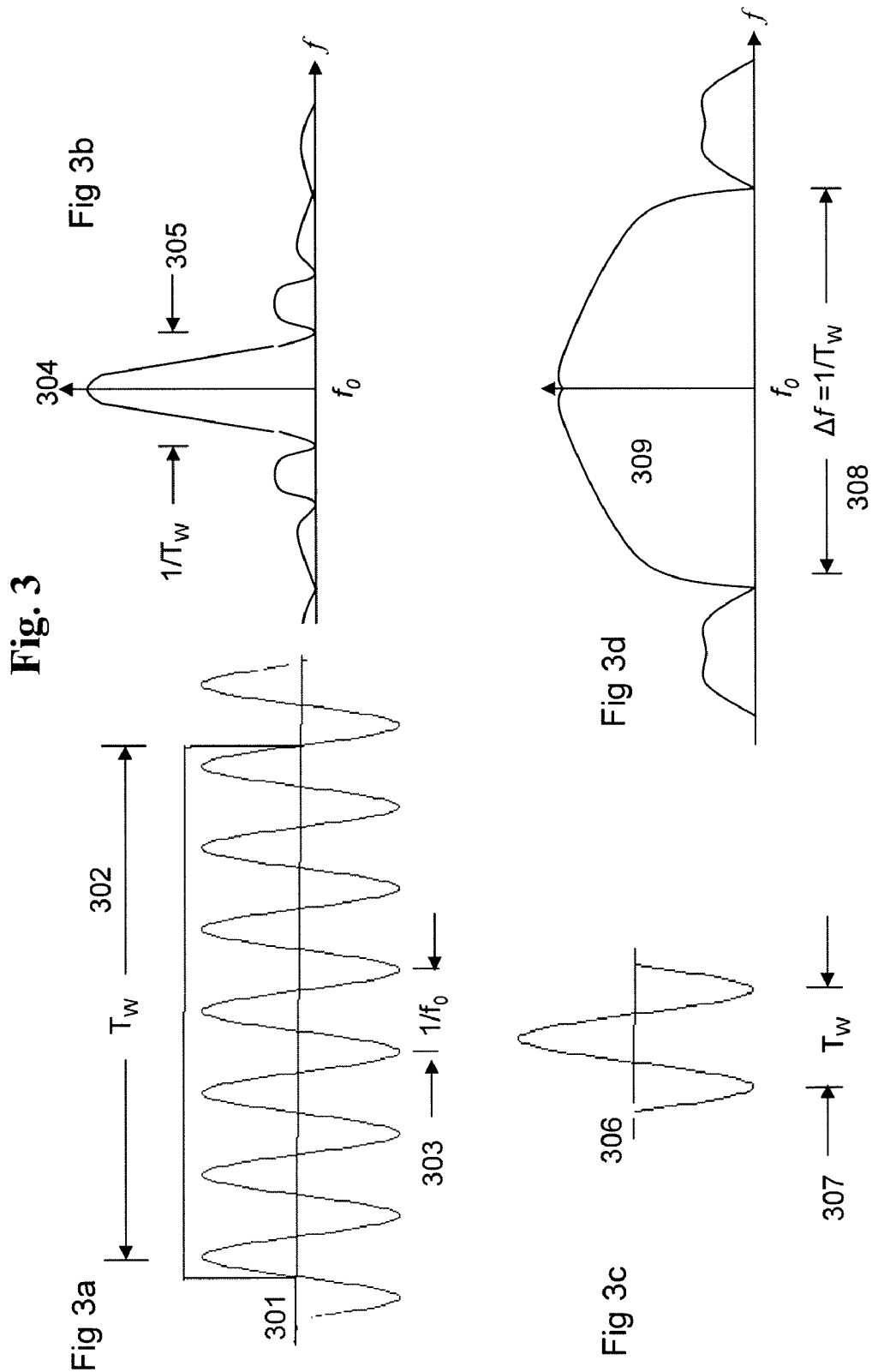
FIGS. 3a-3d shows an application of the Uncertainty Principle of Information.

In the present invention the main deterministic and cyclostationary features of a conventional DS-SS enumerated above are reduced or removed by introduction of a series of independent, unrelated, random stochastic variations applied to the prerequisite equipment subsystem functions. All variations and sequences are independent of each other and unique for all variables. As previously stated, one of the key objectives of this invention is to radically increase the difficulty of exploitation of the waveform and the information carried by it. The invention drastically reduces the RF signature both in instantaneous magnitude and recognizable profile in conjunction with which it reduces individual waveform component spectral information below the level required for re-compilation of the waveform without the use of an accurate temporally synchronized reference signal. FIG. 3 shows the application of the Uncertainty Principle of Information as mentioned in the foregoing. It should be noted that the drawings in FIG. 3 are not to scale and temporal and spectral windows are purposely disproportionate for ease of explanation. FIG. 3a shows a time window $T_w$, 302, of a sinusoidal sequence 301. The Fourier transform of the waveform 301 gives the familiar sin(x)/x spectral representation in FIG. 3b. The transformed window $1/T_w$ is represented by the main lobe 305, while the single cycle $1/f_0$, 303, appears as the peak, 304. When the window 302, is shortened, as shown in FIG. 3c, 307, making the time of observation more precise, its transform spectrally blurs, as seen in FIG. 3d. It will be seen, therefore, that the spectral information alone contained in FIG. 3d is insufficient to determine its exact frequency. The lack of spectral information present in the waveform invention described herein, therefore greatly increases the difficulty of reconstructing the waveform when presented only with spectral information. The accurate timing information contained in a reference signal will enable complete recognition and placement of the representative spectral code elements. As stated in the foregoing, when 'n' sets of independently random variables are used in unison, the number of possible combinations and permutations of events in the resulting distribution rapidly becomes extremely large. In the following invention embodiment example, seven unrelated, random stochastic sequences are used, each containing a large number of random events. It will be readily seen by persons familiar with both the art and the underlying theory that the number of combinations and permutations tends to become astronomical, therefore, without sufficient spectral and temporal information it becomes almost impossible to extract the necessary information to reconstruct any of the component sequences sufficiently to retrieve the transmitted data.

In the following example of an embodiment of the invention, seven independent pseudo-random variable stochastic processes with independent distributions are employed. Pseudo-random variations are applied to the following:

Long, unique, PN spreading sequences, on a one-time use basis.
Chip clock frequency.
Chip frequency-dwell period.
Data symbol rate.
Data symbol rate dwell.
RF carrier frequency (dithering).
Carrier frequency dwell-time.

A number of other variations are also possible, for example, including, but not limited to:
Separate PN codes for the in-phase (I) real, part of the complex signal and the quadrature (Q) imaginary, part.
Carrier phase dithering.
Multiple tandem PN modulation stages each with individual variations. Carrier amplitude adjustment.

The number of variations applied to waveform generation was severely limited in prior art due to the inability of communicants to synchronize. Communication using a waveform comprised of a combination of numerous independent stochastic components is facilitated, in this invention, by its ability to synchronize when employing other than highly accurate timing devices.

Long unique PN sequences for use on a one-time basis only may be generated in a multiplicity of ways, using well known shift register methodology, for example, or by other more secure cryptographic algorithms. The use of a PN sequence longer than any single communication period significantly increases the difficulty of assembling the complete sequence required for dispreading the signal. Using the sequence on a one-time only basis denies the would-be unauthorized interceptor the any advantage of information gleaned from prior intercept attempts. Furthermore, the non-repetitive nature of the signal prevents even occasional spectral lines in signal analysis.

It will immediately be apparent to those familiar with the art that the PN and chip-clock rate may be varied in several ways, for example, but not limited to:
Varying chip-clock frequency and dwell times applied to directly to the PN spreading sequence, with total chips per symbol as an integer.
Varying chip-clock frequency and dwell times applied to directly to the PN spreading sequence, where the total chips per data symbol is not necessarily an integer.
Varying chip-clock frequency and dwell times with random clock phase changes independent of data symbol transition positioning.
Varying chip-clock frequency and dwell times with random clock phase changes, some of which are timed to coincide with potential data symbol transition timing.
A combination of two, or more, unrelated PNs are used to spread the signal.
A combination of two, or more, unrelated PNs with coincident variations.
A combination of two, or more, unrelated PNs with unrelated variations.
A combination of two, or more, unrelated PNs applied to both I and Q are used to spread the signal.
Combinations of any and all of the above variation methods.

Figure 4:
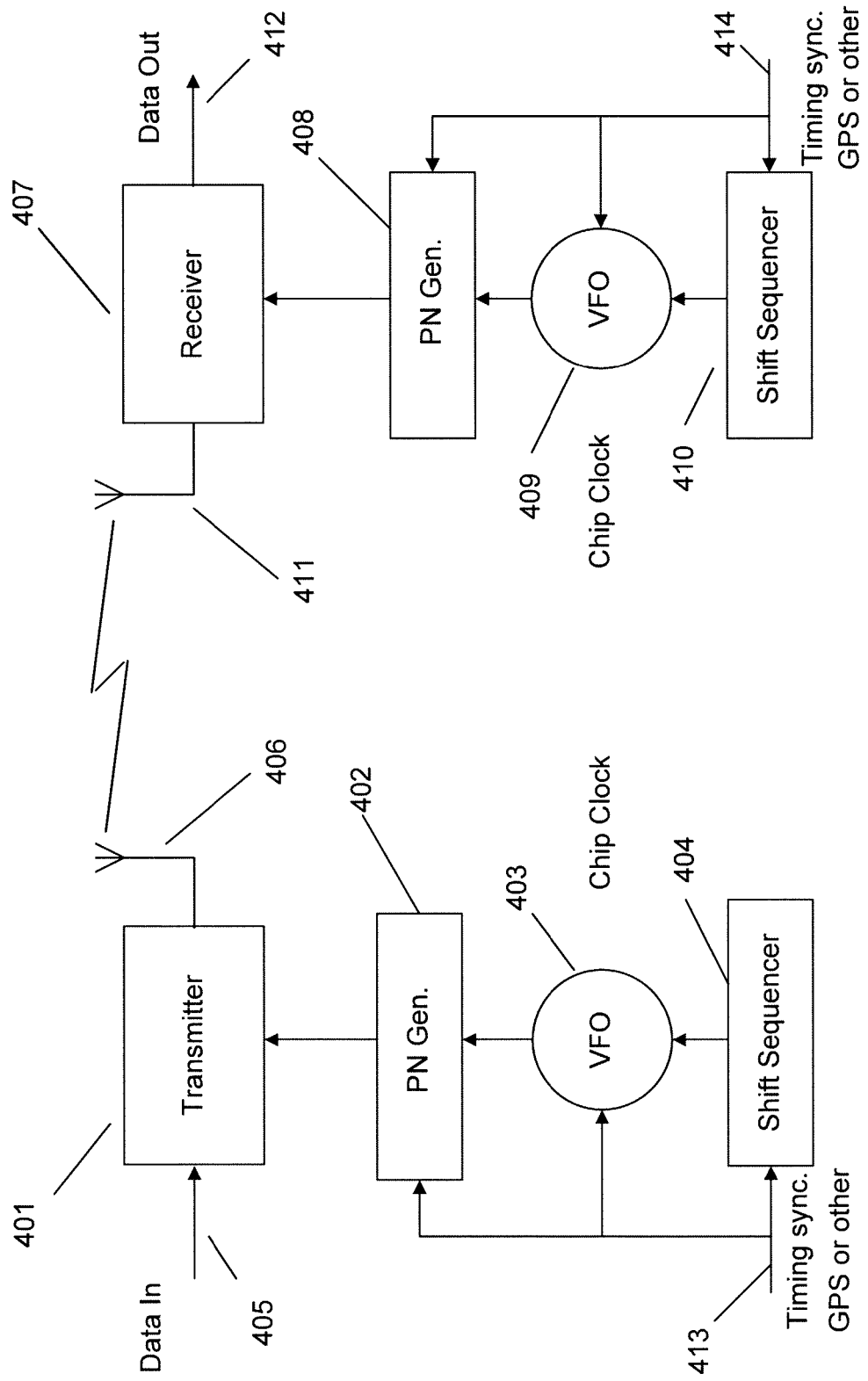
FIG. 4 shows a simplified arrangement of a DS-SS transmitter and receiver employing a variable frequency PN spreading sequence.

The number of chips per symbol will automatically vary as the chip-clock frequency is varied. However, further pseudo-random variations of the number of chips per symbol may be either factored into the randomization of the chip-clock variations or applied as a separate unrelated variable. FIG. 4 shows a simplified arrangement of a DS-SS transmitter 401 and receiver 407 employing a variable frequency PN spreading sequence. The information to be transmitted is represented by a data stream, Data In, 405, which modulates the transmitter carrier. The transmitter carrier is further modulated by the PN sequence, produced by the PN generator 402, which is clocked by the variable frequency oscillator Chip Clock 403, the frequency of which is varied in accordance with a control sequence generated by the Shift Sequencer, 404. The receiver, 407, de-spreads the received signal by applying a precisely synchronized copy of the transmitted PN. The signal is thus restored, and the data 412 is retrieved by demodulating the carrier in the normal manner. In order to achieve this, a control sequence, similar to that generated by the transmitter Shift Sequencer 404, is generated by the Shift Sequencer 410, and applied to the Chip Clock 409, to produce a series of chip frequency variations identical to those output by the transmitter Chip Clock 403. The timing of the receive shift sequence is delayed to accommodate the signal transmission delay between the Transmitter Antenna 406 and the Receiver Antenna 411, plus the processing delays of both equipments. Equipment delays and free-space transmission delay are calculated, as is later explained more fully, to enable exact synchronism of transmit and receive processes. The output of the Chip Clock 409, is applied to the PN Generator 408, so that a similar varying PN to that of the transmitter is applied in synchronism to the received signal to perform the necessary de-spreading. Basic timing synchronization between transmitter and receiver may be achieved in numerous w ways; one such method is to derive timing from received GPS signals. Timing synchronization signals, 413 and 414 are applied to the transmitter and receiver Shift Sequencers, 404 and 410, Chip Clocks, 403 and 409, and to the PN Generators, 402 and 408. Other methods of synchronization, for example include, but are not limited to, use of other high accuracy timing sources such as standard time transmissions from WWV, use of temporary field time standard equipment, portable cesium and rubidium atomic clocks, amongst a myriad of others which will be immediately apparent to others familiar with the art. In this invention, synchronization is achieved without GPS or other high accuracy timing assistance, as will be fully explained in a later section herein.

Figure 5:
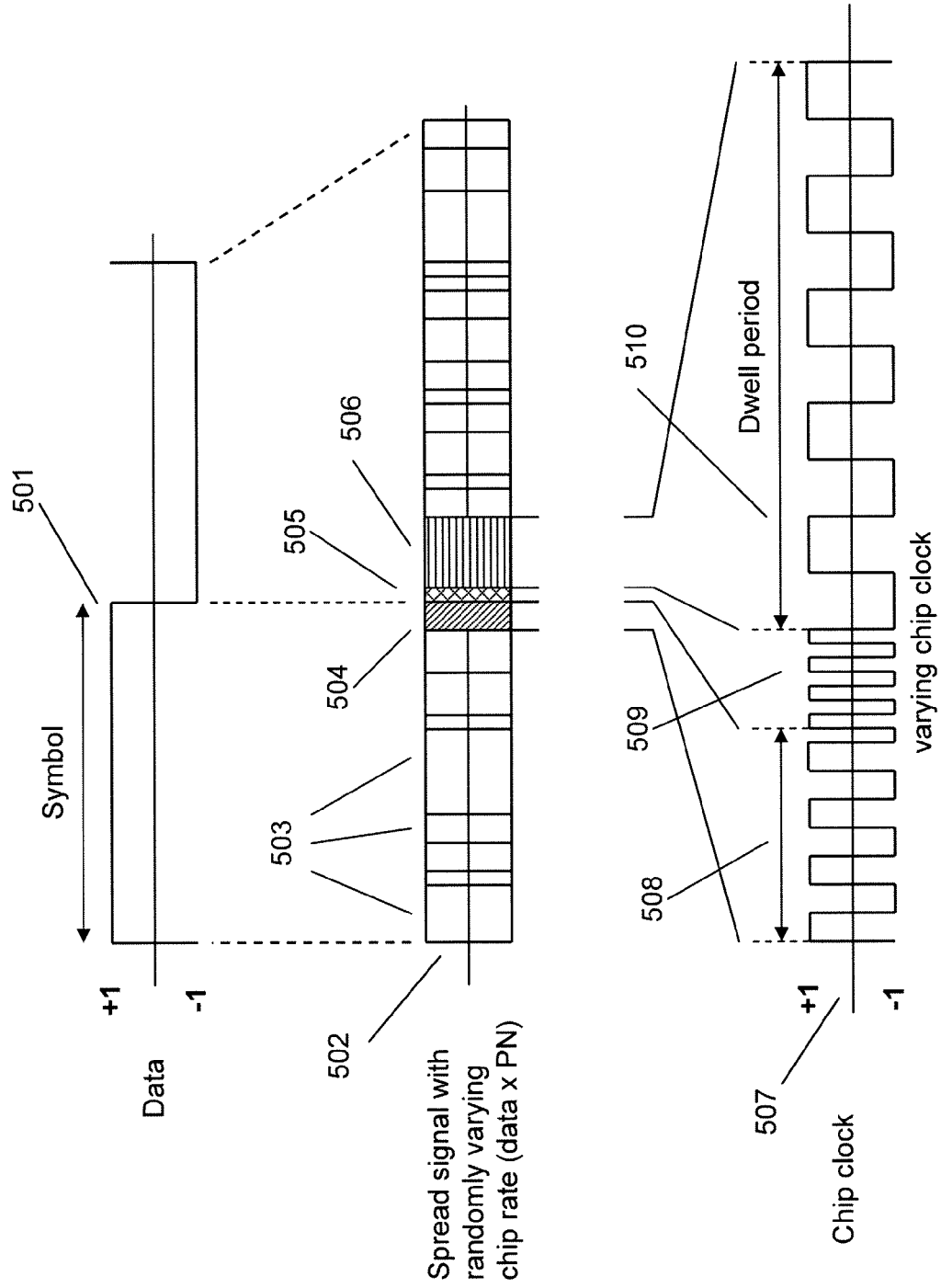
FIG. 5 shows how a signal is spread by a PN with varying chip and dwell rate.

FIG. 5 shows how the signal is spread by a PN with a varying chip rate. The signal is spread by the varying PN modulating the two data symbols 501, resulting in a combination of frequency variations of the spread signal, 502. The period for which the chip rate frequency remains constant is called the dwell-time. The dwell-time for any one PN chip frequency is pseudo-random, such that it is not deterministic and will not produce cyclostationary features in the output signal. A number of varying PN chip clock frequencies with pseudo-random dwell-times 503, are shown during the two data symbol duration spread signal sequence, 502. Three specific frequency variations and dwell times, 504, 505 and 506, are shown with related varying chip clock timing 508, 509 and 510, in chip clock sequence 507.

The spectral results of two conventional digitally modulated radio signals, peaked signal and DS-SS, plus the RF signal envelope resulting from this embodiment of the invention, are shown in FIG. 6. The data input 601, with symbol 602, to a conventional peaked radio signal transmitter is shown in FIG. 6A, with the resulting spectral response portrayed in FIG. 6B. The signal is characterized by a narrow bandwidth main lobe 604, with high amplitude, the total average power 603, being contained therein. The spread signal using a PN applied at a steady, unvarying, chip rate, 606, in FIG. 6C, produces the familiar conventional DS-SS RF envelope shown in FIG. 6D. The same total average power, 608, as the signal in FIG. 6B is now contained in a much wider bandwidth main lobe with correspondingly lower amplitude, 607. Side-lobes, 609, are also further suppressed, compared to the corresponding spectral features, 605, in FIG. 6B.

In this embodiment example of the present invention, the symbols, 610, in FIG. 6E, are spread by a PN sequence (not shown) using a number of pseudo-randomly varying chip-clock frequencies, and dwell times, 613 and 614, as described in the foregoing, producing the frequency varying sequences, 611 and 612, corresponding to the two symbols. The resulting RF envelope is shown in FIG. 6F. The amplitude, 615, is much less than 607, in FIG. 6D, but the total average power, 616, is the same, with proportionally differing and continuously varying spectral occupancy, as evidenced by the position of the secondary lobes, 617. FIG. 7A shows a more detailed view of the example in FIG. 6F. The amplitude of the main lobe, 701, 702, varies according to the amount of spreading resulting from the particular chip-clock frequency and PN—symbol product during each dwell period. As the spreading, 703, momentarily increases, the amplitude, 701, will drop to 702, with the total average power remaining constant. The AWGN, 704, in FIG. 7B is shown at constant amplitude for illustrative purposes only with the spikes, 705, resulting from the chip-clock frequency change impulse response, occurring at random intervals. In the case of real AWGN characterized by random amplitude variations, these impulses will blend into and become part of it. It will be readily apparent to those familiar with the art that variations independent of, but similar to the foregoing chip variations, applied to the data symbol sequence will, in turn, further randomize the signal spread to facilitate the AWGN characterization.

Carrier dithering, comprising short-term random frequency shift, with randomized short term dwell periods serves to flatten the overall spectral response, such that the usual collection of greater amplitude responses do not tend to centralize, or clump, thus further decreasing the RF signature and blending the signal with the AWGN. Optimum results are obtained with randomization that does not produce a center frequency, thus, randomizing the spectral response to remove all band definition and thereby greatly decreasing signature characteristics which may act as discriminators aiding identification of the increase in power spectral density as a signal as compared to normal random noise perturbations.

Figure 8:
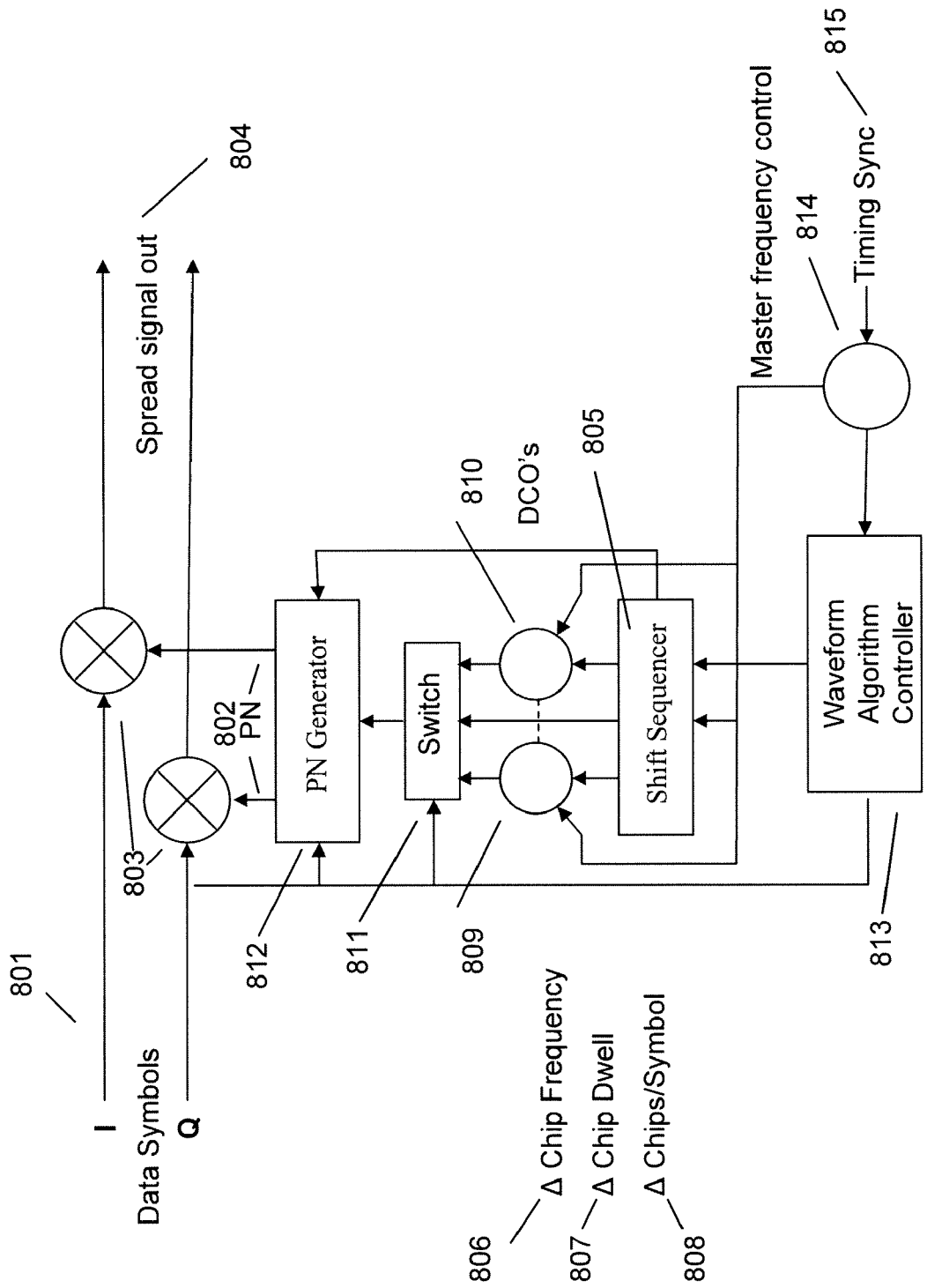
FIG. 8 illustrates an example of a sub-system embodiment of chip variations, chip frequency, chip-dwell, and chips-per-symbol employing conventional analog modulation methodology.

FIG. 8 is an example of a sub-system embodiment of chip variations, chip frequency, 806, chip-dwell, 807 and chips-per-symbol, 808, described in the foregoing, employing conventional analog modulation methodology. A sequence of Data Symbols, 801, is modulated by a varying PN, 802, by means of the I and Q modulators, 803, producing a spread signal, 804. The unique variation sequence produced by the waveform algorithm controller, 813, is generated with coefficients provided by a key originating sequence, described later in this filing. The waveform algorithm controller generates an ongoing non-repetitive, unique sequence of variation instructions, 806, 807 and 808, which are fed to the shift sequencer, 805. Two, or more digitally controlled oscillators (DCO's), 809 and 810, operate sequentially. One DCO provides the current chip frequency to the PN generator, 812, via the switch, 811, while the second and successive DCO's are preset and rendered operative, but not connected, in readiness for changing to the next chip frequency, 806, on expiry of the current dwell period, 807. By this method, the chip frequency can be changed instantly, with no stewing and with a predetermined phase relationship, thus rendering a random change impervious to phase-lock tracking by a would-be interceptor. The waveform algorithm controller provides the necessary coefficients and algorithmic instructions to the PN generator so that a unique sequence is generated for each communication. The algorithm controller, in conjunction with timing derived from the master frequency control, 814, controls the precise instant the switch, 811, changes to the next DCO. Master frequency control timing is used as a basis for all sub-systems, shift sequencer, DCO's, switch and PN generator, so that each operation is fully synchronized to the necessary degree of accuracy, for example, sub-nanosecond, if required.

From time-to-time the master frequency control timing is updated and precisely set by timing synchronization, 815, derived from GPS or other accurate timing source. In an embodiment of the invention where GPS is used, as one example, a GPS receiver is incorporated as part of the equipment, other embodiments may include a tunable receiver or one pre-tuned to WWV or other designated reference, for example, as mentioned in the foregoing. The GPS timing signal is accessed from time-to-time to correct any drift that may have occurred in the frequency and transitions of the master frequency control oscillator and to update and correct any time-keeping error including the precise time-of-day. Access will be in accordance with the stability of the master frequency control oscillator and the timing accuracy required for the operation of the equipment in the system in which it is deployed. As mentioned above, timing synchronization signals may be derived from alternate sources as may be deemed necessary. As will be explained in detail later, in this invention, precise timing synchronization may be derived from a communicant's signal, both for key synchronization and for the duration of a communication. By this means, essential real-time synchronization can be initiated and maintained in the absence of immediate GPS or other timing reference source.

Figure 9:
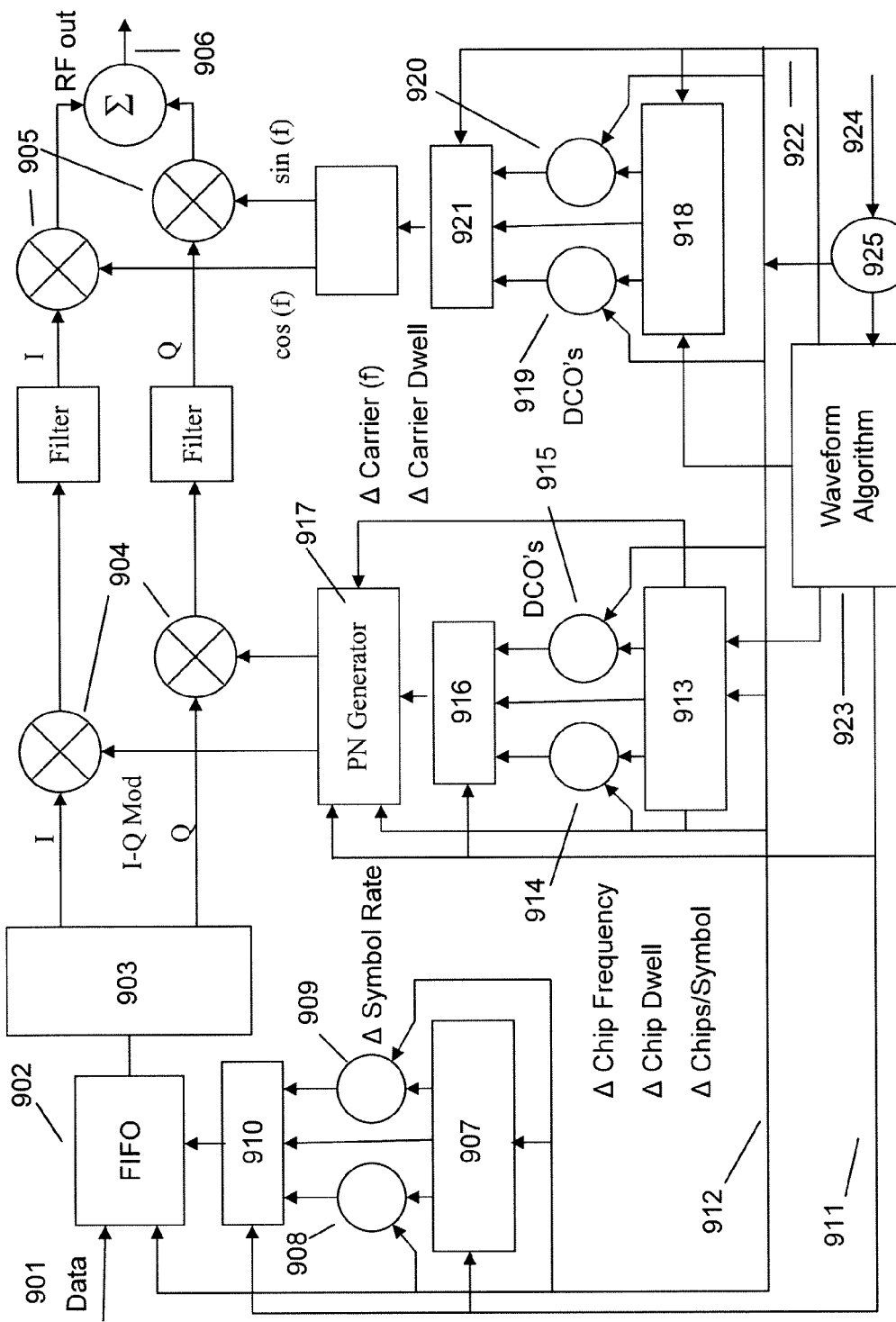
FIG. 9 illustrates an example of a transmitter embodying PN chip-clock variations, pseudo-randomly varied data symbol rate, and pseudo-randomly varied RF carrier.

FIG. 9 is an example of a transmitter embodying the PN chip-clock variations described in the foregoing, pseudo-randomly varied data symbol rate and pseudo-randomly varied RF carrier. An information stream comprising data symbols, 901, is connected to a first-in-first-out (FIFO) buffer, 902. The output of the FIFO, which is clocked at varying rates for periods of time determined by the waveform algorithm controller, 923, is fed into the I and Q separator, 903. These clock variations are applied to the FIFO via the sub-system comprising the sequencer, 907, two or more DCO's, 908 and 909, and the switch, 910, which controls the selection of the DCO generated clock signal to both the FIFO and the shift register, 903. The output of the shift register, 903, is connected to one input of the I and Q modulators, 904, the other input being taken from the output of the PN generator, 917. The operation and configuration of the sub-system producing the pseudo-randomly dithered PN is similar to that shown in FIG. 8, wherein the waveform sequence information is produced by the waveform algorithm generator, 923, and passed to the sequencer, 913, and PN generator, 917. Two or more DCO's, 914 and 915, one providing the current PN clock timing whilst the others are preset to subsequent frequencies with the correct phase relationship, as may be necessary, and are routed to the PN generator when selected by the switch, 916. The output of the modulators, 904, is connected to the input of the final modulator stage, 905, in this example of an embodiment of the invention. The other input to 905 is the RF carrier. The RF carrier is generated by one of the two or more DCO's, 919 and 920. The carrier frequency is varied on a pseudo-random basis in accordance with information produced by the waveform algorithm generator, 923, and processed by the sequencer, 918. As in previous sub-systems in this arrangement, the output of the DCO' providing the current frequency is routed via the switch, 921, to the input of the modulator, 905, subsequent carrier frequencies being routed to the modulator, as required after appropriate dwell times. The RF carrier is spread by the randomly varying output of modulator, 904, and coupled to the RF Output, 906. Power amplifying and filter stages, which may be employed as required, are not shown for the sake of clarity. Accurate timing is provided to elements of the sub-systems by the master frequency control, 925, which obtains synchronization from a GPS or other accurate timing source, as described in the foregoing.

Figure 10:
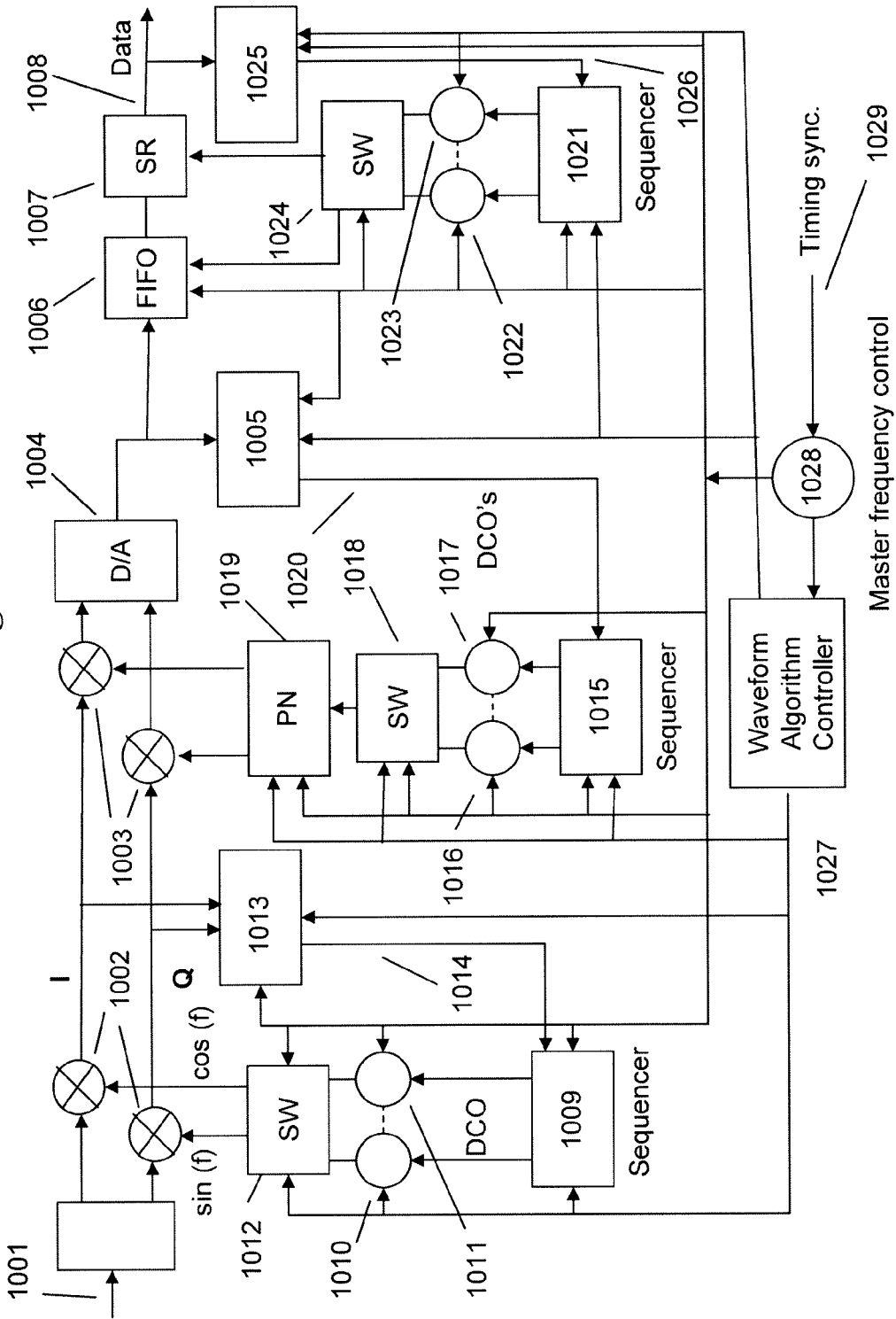
FIG. 10 shows an example of a receiver arrangement to work with the transmitter shown in FIG. 9.

FIG. 10 shows an example of a receiver arrangement to work with the transmitter shown in FIG. 9. As may be seen, the receiver has a similar arrangement of sub-systems for decoding the variations in the signal produced by the transmitter in FIG. 9. The RF signal input, 1001, is fed to the down converter I and Q, 1002. A sub-system comprising Variation Sequencer 1009, two or more DCO's 1010 and 1011, operating similarly to DCO's 908 and 909 in FIG. 9, and the Switch 1012, generate the local oscillator frequency, in cosine and sine relationship, required for down conversion of the signal. The local oscillator frequency corresponds to that used by the transmitter in FIG. 9, both in frequency and timing, such that the output of the down converter, 1002, will replicate the output of the modulator, 904, in FIG. 9, i.e. the intermediate frequency (IF), an exact replica of the IF in FIG. 9, prior to up conversion and addition of carrier dithering variations. In order to achieve this, the waveform algorithm controller, 1027, generates control signals in precise synchronism with the signal received from the transmitter, inclusive of transmission and equipment delays. Thus when the local oscillator DCO, 1010 or 1011 output is selected by the switch, 1012 and applied to the demodulator for the precise dwell time applied by the transmitter, the output of the demodulator will correspond exactly to the output produced by the modulator 904, in FIG. 9, when the signal was generated. As synchronization variations may occur, typically due to transmission delay related signal time of arrival, (TOA), and frequency variation due to Doppler effect, where communicants are mobile, corresponding corrections need to be made in generation of signals by the DCO's, 1010 and 1011. Multiple correlators, 1013, provide timing and frequency windows, which track all received signal deviations from the parameters calculated by the sequencer, 1009. A number of correlator arrangements can be used to provide tracking and correction signals, such as various RAKE receiver configurations, for example and other commonly used sliding window configurations. Error signals, 1014 are fed back to the sequencer which corrects the outputs of the DCO's, 1010 and 1011, so that exact synchronism is achieved and dynamically maintained.

The sub-system comprising, Variation Sequencer 1015, DCO's 1016 and 1017, Switch 1018 and the PN generator 1019, generates an identical varying PN to that used by the transmitter in FIG. 9. Similarly to the sub-system generating the local oscillator frequency, described in the foregoing, appropriate transmission and equipment delays are calculated by the Waveform Algorithm Controller 1027, converted to specific sub-system element commands by the Sequencer 1015, and applied to the PN signal generated by this sub-system. The resulting replica of the original PN used by the transmitter is then input to Demodulator, 1003, the output of which is converted to a digital signal by the D/A, 1004. Those familiar with the art will readily recognize that filtering, not shown for the sake of clarity, removes all higher order products from the signal, after which, if the sub-system is fully synchronized, it replicates the varying rate data symbol stream present at the input to the modulator, 904, in FIG. 9. As in the previous stage of the receiver, multiple Correlators 1005, operating in a similar manner to Correlators 1013 window the filtered signal for timing errors. The error signal, 1020, is fed back to the Sequencer 1015, which applies any corrections necessary to the DCO's 1016 and 1017.

The filtered output signal from the low pass filter is passed to the FIFO, 1006, which acts as an elastic buffer for the varying rate symbol stream. The Sequencer, 1021, DCO's, 1022 and 1023, and the switch, 1024, form the sub-system which applies a replica of the time-varying data-symbol clock signal, used by the transmitter in FIG. 9, to the Shift Register, 1008. Provided that the SR clock output from the switch is fully synchronized, the symbol stream will be accurately recovered and output at a constant rate. The Correlators, 1025, window the output, 1008, for timing errors, for which a corresponding signal, 1026, is fed back to the Sequencer, 1021 which generates the necessary synchronizing corrections for the DCO's, 1022 and 1023.

The master frequency control, 1028, obtains timing synchronization from either the GPS timing signal or other accurate source periodically, in similar manner to the transmitter, as explained in the foregoing. The waveform algorithm controller formulates the necessary command parameters for the sub-system sequencers based on the coefficients derived from a unique communications key.

FIGS. 8, 9 and 10 and the foregoing explanation are only one example of numerous possible embodiments of the invention. It will be seen, by those familiar with the art, that the various sub-systems described in the foregoing may be realized by a wide range of combinations of digital and analog circuitry and methodology. The invention inherently lends itself to digital realization by virtue of the sub-system timing elements. For example, the complete transmitter system may be realized entirely digitally, prior to a final D/A converter to convert the digitally constructed waveform to analog form for power amplification and antenna coupling. Similarly, the receiver may be digitally realized following antenna coupling, low noise amplification and A/D conversion. Analog down conversion will not be necessary where directly received signal A/D conversion provides high enough sample rates for accurate synchronization and demodulation. It follows, therefore, that the technology may be placed on a chip, FPGA, gate array or mixed signal technology according to the design. This in turn provides strict timing control for all elements, to a degree unattainable with hitherto used printed circuit board and other multi-component approaches. It will also be seen that the technology offers a wide range of operational flexibility. For example, various degrees of security can be dynamically achieved by addition or removal of particular variations from the waveform algorithm. This can be achieved as a user function during or prior to communication, and, or as part of the resident operating system to enable automatic communication at set levels of security with certain groups of equipment using the waveform or to enable communication with legacy equipment, for example.

Minimum Impulse Phase Shift Keying

Phase Shift Keying (PSK) in all of its conventional forms causes significant impulse responses to the almost instantaneous signal phase change, regardless of how small. These sudden phase changes cause impulses, Dirac delta function responses which have high spectral visibility. Therefore, if PSK is used as a means of modulation for one or more of the variations the sudden phase change will cause an impulse response, which is spectrally detectable.

Figure 11:
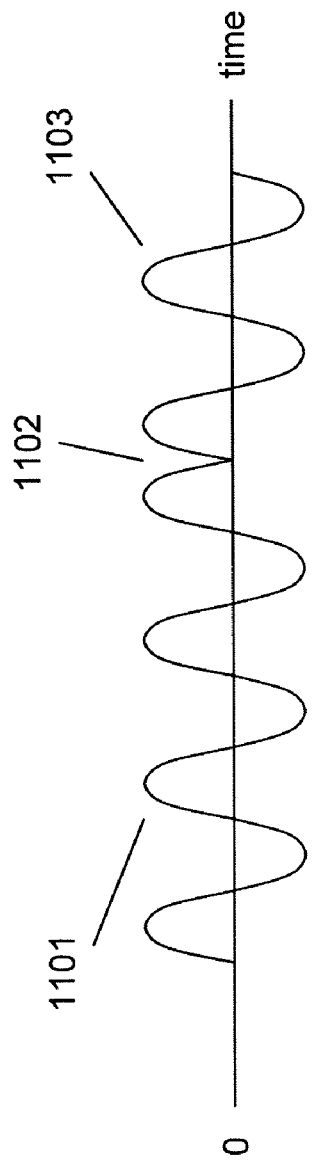
FIG. 11 shows conventional m-ary phase shift keying of $\pi$ radians where the initial signal phase is reversed resulting in two sequential half cycles of similar phase.
Figure 12:
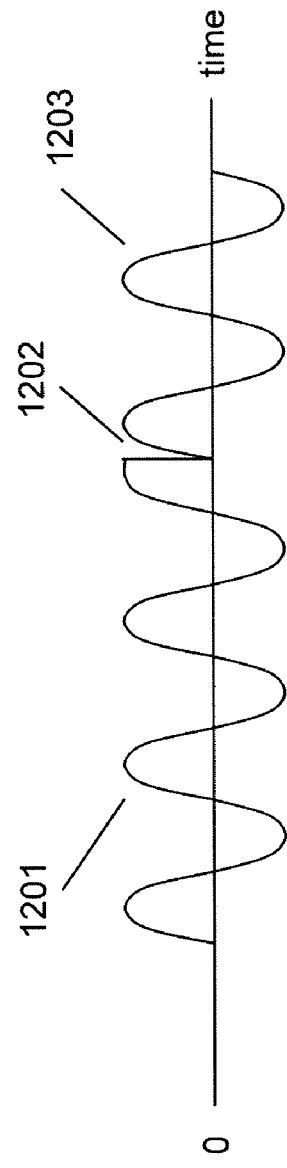
FIG. 12 shows a conventional m-ary phase shift keyed signal shifted $-\pi/2$ or $+3\pi/2$ radians and the resulting shifted signal.
Figure 13:
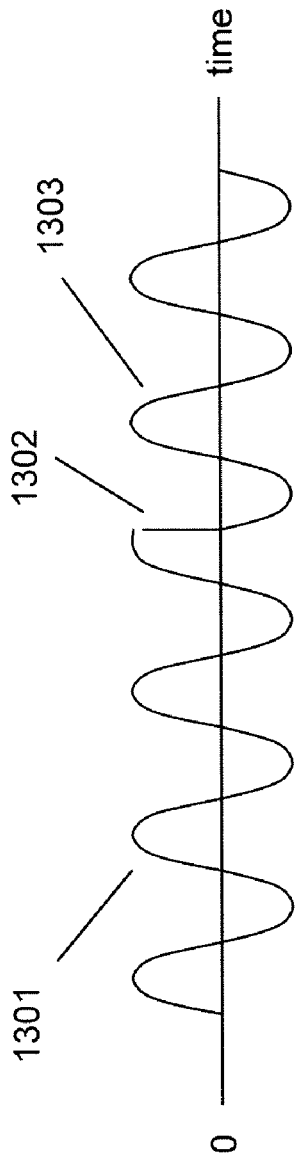
FIG. 13 shows a conventional m-ary phase shift keyed signal shifted $+\pi/2$ or $-3\pi/2$ radians and the resulting shifted signal.

FIGS. 11, 12 and 13 show the three examples of basic phase transitions in typical conventional quadriphase shift keying, QPSK, modulation. FIG. 11 shows a phase shift of $\pi$ radians where the initial signal phase, 1101, is reversed resulting in two sequential half cycles of similar phase, 1102. The resulting signal, 1103, is phase shifted $\pi$ radians compared to 1101. FIG. 12 shows a signal, 1201, shifted $-\pi/2$ or $+3\pi/2$ radians at 1202, with the resulting signal phase 1203. FIG. 13 shows a signal, 1301, shifted $+\pi/2$ or $-3\pi/2$ radians at 1302, and the resulting shifted signal, 1303. A series of other similarly radical phase shift signal distortions are created for other PSK modulation schemes such as, but not limited to, binary phase shift keying (BPSK), quaternary phase shift keying (QPSK), offset QPSK (OQPSK) and other multiple phase shift keying (M-ary PSK) methods.

Figure 14:
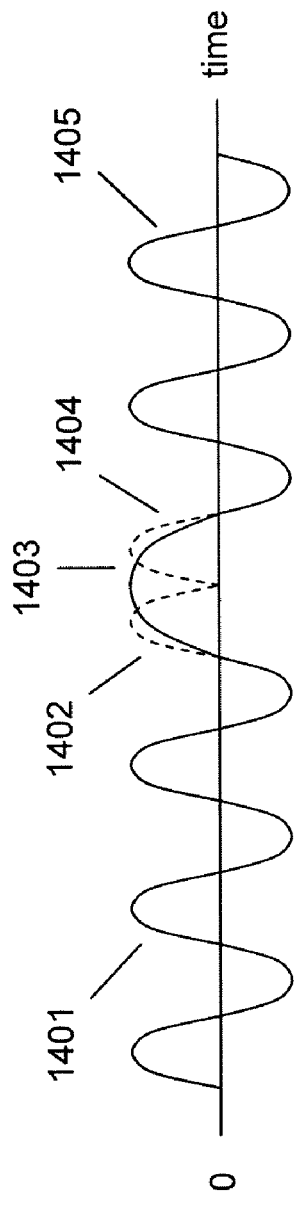
FIGS. 14-16 illustrate a minimum impulse phase shift keying (MIPSK) technique.
Figure 15:
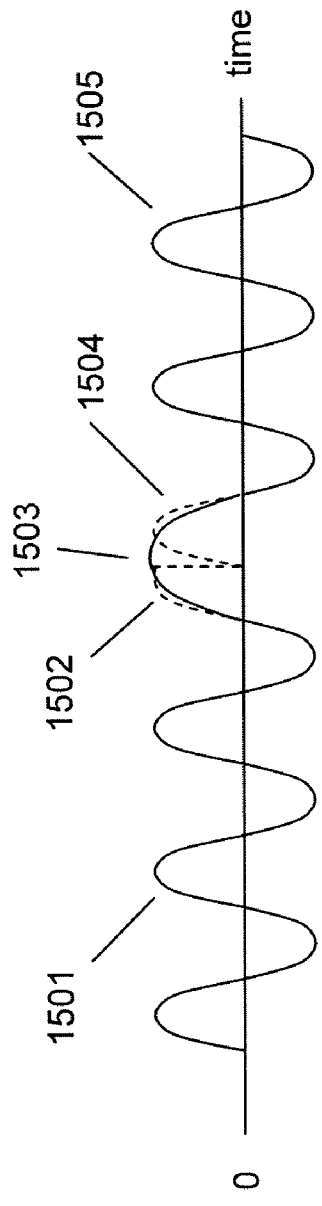
Figure 16:
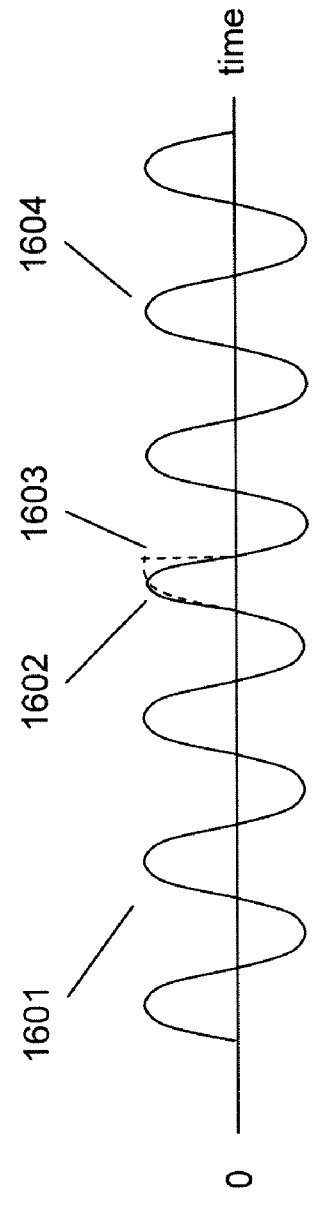

FIGS. 14, 15 and 16 show a novel method, minimum impulse phase shift keying (MIPSK), of performing phase shifting by insertion of a half cycle of a frequency differing from that of the original signal such that the following signal waveform changes in phase from that of the prior signal whilst maintaining the original frequency. Thus, by this method, the signal phase is changed within the range 0 to $2\pi$ without varying the frequency of the original signal for a period greater than $\pi$ radians by advancing or retarding the phase. In FIG. 14 a constant frequency signal, 1401, is phase shifted $\pi$ radians commencing at the zero crossing 1402. A sinusoidal half cycle of half the original signal frequency, 1403, is inserted into the sequence, followed by a continuous sequence of waves, 1405, at the original frequency. A dotted line, 1404, shows the conventional phase shift of $\pi$ radians. FIG. 15 shows a phase shift of $-\pi/2$ or $+3\pi/2$ radians. The signal, 1501, is phase shifted at 1502, by insertion of a sinusoidal half cycle, 1503, of $\frac{3}{2}$ times the original frequency, which results in a phase shift of $-\pi/2$ or $+3\pi/2$ radians. The phase shift is followed by a continuous sequence of waves, 1505 at the original frequency and shifted phase. The signal, 1601, in FIG. 16 is phase shifted, in this example, by insertion of a sinusoidal half cycle, 1602, of $\frac{2}{3}$ times the frequency of the original signal, which results in a phase shift of $+\pi/2$ or $-3/2\pi$ radians. The transition is followed by a continuous sequence of waves of constant frequency and correctly shifted phase, 1604. The conventional PSK phase shift of $+\pi/2$ or $-3/2\pi$ radians is shown by the dotted line, 1603.

To those familiar with the art, it will be seen that M-ary phase shifting can be accomplished by inserting half waves of various sizes varying in duration, i.e. in frequency, from the original signal proportional to the desired phase shift. Phase shifting of this nature can also be accomplished by use of single half cycles or combinations of multiple half cycles of proportionally greater or smaller duration than when a single half cycle is employed. It is not necessary that all the half cycles in such combinations be of equal duration, only that the cumulative duration of the combination of half cycles be of the appropriate length to produce the correct phase shift. MIPSK is also used to apply the frequency variations in this invention for the waveform carrier frequency dithering, so that impulse responses resulting from instantaneous frequency change are minimized.

The number of half cycles, or combinations thereof, may be varied on a pseudo-random basis to add yet a further variable to the encrypted waveform which in itself will create DFT frequency components of lesser amplitude.

Equipment Initialization

In this invention, a unique one-time set of waveform algorithm coefficients is generated by communicants for the duration of a communication session, or part thereof. No keys are stored in the equipment, at other locations at any time, or exchanged prior to, or during communications. Algorithm coefficient keys are locally generated by equipment units at the time of communication origination and again during the communication period itself, if required.

A precise instant in time is identified, using GPS or other timing and time reference accurate commensurate with the timing precision required for mutual operation of the particular group of equipments being initialized. Precise time-of-day is one method providing mutual identification of a specific instant in time. Two or more equipments are set up such that a particular instant in time may be mutually identified and simultaneously stored by all as their "Com-Root". The object of this is to provide a point of reference in time after which it is possible to generate sets of coefficients for the waveform generation algorithm at specific time intervals. The set of unique waveform coefficients generated at a time point selected after the establishment of the Com-Root is called a Com-Key. Com-Keys can be generated at intervals based on a common time base established at initialization to enable groups of equipment to communicate with each other.

Figure 17:
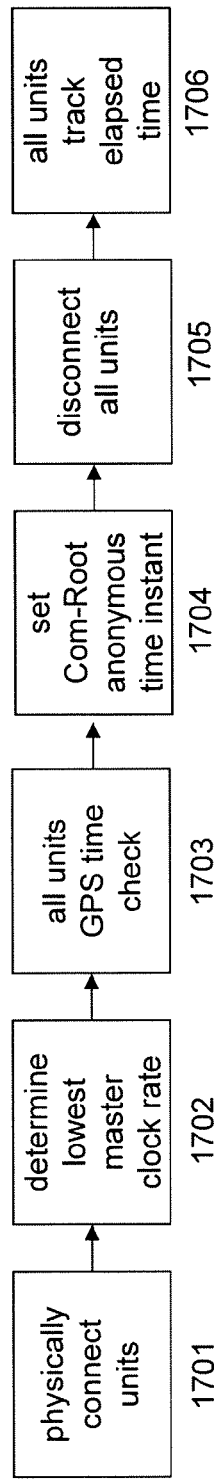
FIG. 17 illustrates a flowchart showing the basic principle of initialization in accordance with an exemplary embodiment of the invention.

A flow chart showing the basic principle of initialization is shown in FIG. 17. For this example, it is assumed that all master timing oscillators are drift-free and therefore all equipment units have exactly the same time. The equipment units that will be used to communicate with each other are connected, 1701, to an initialization controller which steps the units through each phase of initialization in concert. The connection setup is such that all delays between the controller commands and the equipment response thereto are the same for all units within limits that will ensure that the same time instant is detected and stored by all. The lowest master clockrate, or other limiting timing factor is determined for the units, 1702. This will be the limiting factor to determine the smallest time interval at which new waveform coefficient keys, Com-Keys, may be generated for mutual operation. The master clock rate and, or other information for determining the key generation interval, may be obtained in a number of different ways, such as, but not limited to, may be stored in equipment firmware, derived algorithmically or entered manually, for example. All units access GPS, or other time standard, and synchronize, 1703. Following time synchronization of all units, a set of initialization symbols is assembled by the controller within which a specific transition will be used by all to set the Com-Root. The controller then transmits the symbol sequence to all units simultaneously. All units will acquire the transition at the same time and register this and record the precise time-of-day as the Com-Root, 1704. As the controller did not predetermine the time instant, the Com-Root generation is truly random and anonymous. The units are now disconnected, 1705, and continue to track elapsed time, 1706.

The Com-Root can be established, 1704, in a number of different ways other than described above including, but not limited to:

1. Randomly selected anonymous instant by the controller as:
    a) Nearest present time instant
    b) Random past time instant
    c) Random future time instant
    d) Random past time instant within a specific time window
    e) Random future time instant within a specific time window
2. Specific time instants selected automatically by the controller in accordance with a preset procedure or algorithm and passed to the units for initialization instead of by individual -continued

| | |
|---|---|
| | unit detection, as described in the foregoing: |
| | a) Present time instant |
| | b) Specific prior time instant |
| | c) Specific future time instant |
| 3. | Dual or multiple time instants for use as operational windows during which the equipments can communicate or remain dormant. There can be an odd or even number of such instants to create specific time windows with the final window remaining open, as one example. |
| 4. | All of the above, inclusive of other possible time instant selections envisioned and or extrapolated from the foregoing, but not included for the sake of brevity and clarity, plus any combination thereof, may be used as a Corn-Root(s) in conjunction with geo-spatial coordinates and other geo-location information to activate, de-activate and or control the unit's communication capabilities. |
| 5. | Similarly, the Corn-Root(s) may be used in combination with other data such as, but not limited to movement and, or lack thereof, velocity, acceleration, deceleration, bio-medical and information, to activate, de-activate and or control the unit's communication capabilities. |

Figure 18:
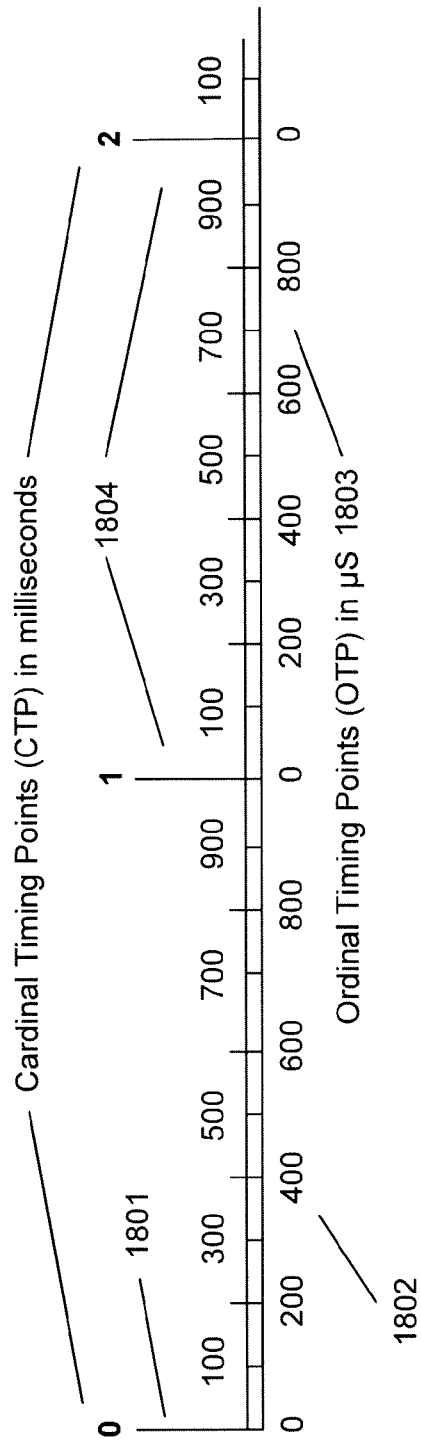
FIG. 18 shows an elapsed time from a Com-Root and its division into CTP's and OTP's

FIG. 18 shows the elapsed time, 1802, from the Com-Root, 1801. The time base in this example has 1 µS interval timing; these are referred to as ordinal timing points, (OTP), 1803. The elapsed time is also divided into larger units of time, multiple OTP's, referred to as cardinal timing points, (CTP), 1804

It will be seen, by those versed in the art, that Com-Roots can be stored or changed in individual equipment, at any time by storing a particular time instant to be shared by others, by manually entering a digital sequence representing the time instant, or by electrically implanting it, by use of recorded media or numerous other methods which can easily be extrapolated from the foregoing. Anonymous Com-Roots may also be used in this manner.

Establishing Com Keys

In the present invention, the Com Keys generated for each equipment, for each communication session, are unique. There are many bases of generation for unique Com Keys. The one selected for this example is based on combinations available from multi-integer vectors. A 20 integer vector has a total of 20! (20 factorial) combinations, i.e. $2.4329 \times 10^{18}$ unique arrangements, each of which can be used as a Com Key. Using the original Com-Root time instant shared by any number of equipments, and making a new combination available from a pool of 20! at the rate of one every 10 nanoseconds, new Com Keys will then be available, without repetition, for a period approximately 771 years. Increasing the Com Root vector to 21 numbers will result in $5.1091 \times 10^{19}$ unique combinations which will last for approximately 1,619 years available at the rate of one every nanosecond. The availability, or generation rate, of Com Keys is of interest regarding the restriction of communications operating locations as will be explained later in this text.

Figure 19:
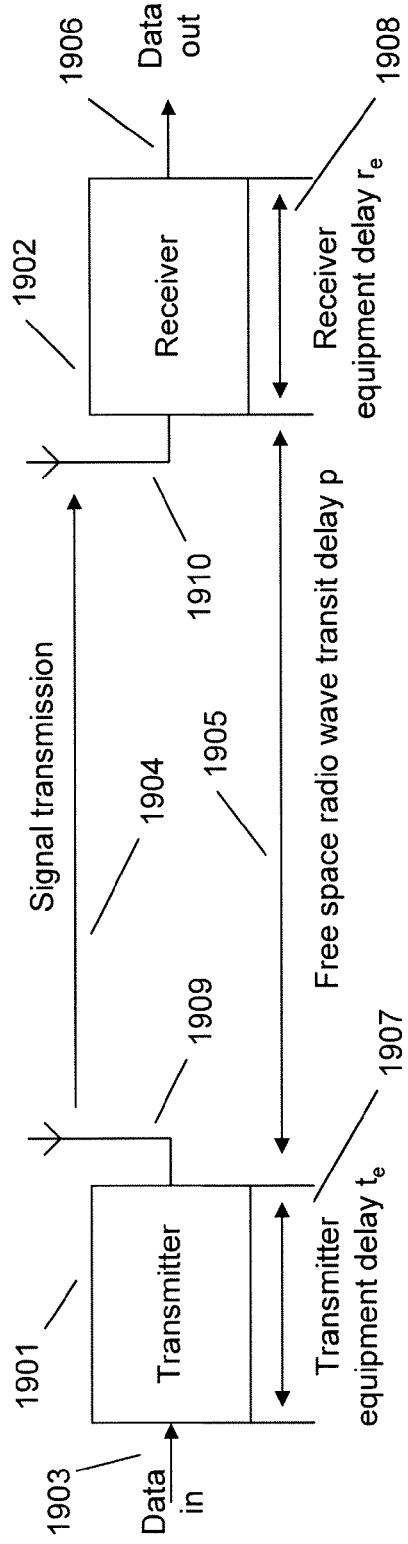
FIG. 19 illustrates the basic methodology employed in an exemplary embodiment of the invention, including the signal transmission time relationship between a radio transmitter and receiver, assuming direct line-of-sight communication, with no multi-path signals.

The example in FIG. 19, explains the basic methodology employed in this invention, showing the signal transmission time relationship between a radio transmitter and receiver, 1901 and 1902 assuming direct line-of-sight communication, with no multi-path signals. The data input stream to the transmitter serves to modulate the RF signal, 1904, which in turn is received and demodulated by the receiver, 1902, and appears as data out, 1906. There is a finite time lapse between data in, 1903, and data out, 1906, comprised of the transmitter equipment processing delay $t_e$, 1907, the receiver equipment processing delay $r_e$, 1908, both of which are assumed to be constants, for this example, and the free space radio wave transit delay p, 1905, which is a function of the distance separating the transmitter and receiver. In this case using a line-of-sight radio link, the direct signal path, assuming no refraction or other path altering phenomena, will be approximately direct via the shortest geometrical route from transmitter antenna, 1909, to receiver antenna 1910. The radio waves will travel at approximately the speed of light, $3 \times 10^8$ meters per second, so the free space delay, in microseconds, will be the distance in meters divided by 300. Thus, if the two equipment antennas are 1500 meters apart, the free space delay will be 5 microseconds. In this example, for a specific data symbol transition at the data input, 1903, the total delay occurring prior to the equivalent symbol transition appearing in the data stream, 1906, at the output of the receiver will be the sum of the two equipment processing delays, 1907 and 1908, and the free space transit delay, 1905:

$$t_e + r_e + p.$$

Figure 20:
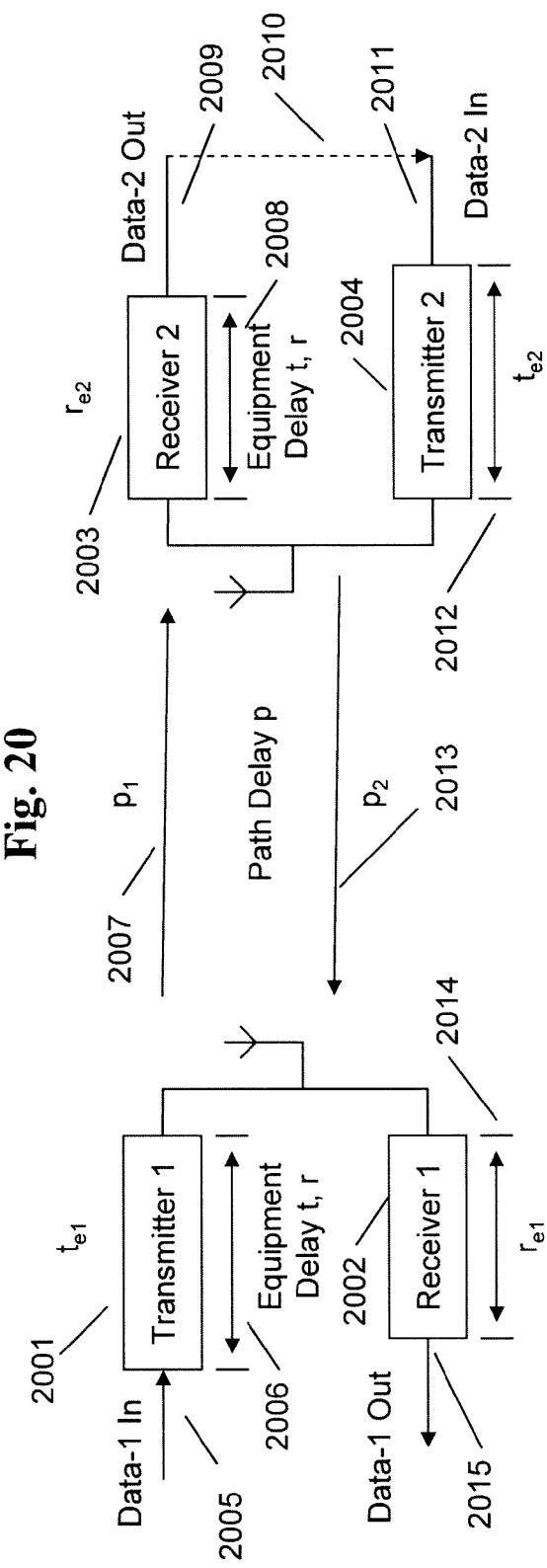
FIG. 20 illustrates identification of a time instant for establishment of a Com Key by selecting a specific data symbol transition within a group of symbols as it transits a predetermined point within the transmitter.

The following example explains the principle employed in one method of establishing a Com-Key. With reference to FIG. 20, a time instant is identified for establishment of the Com Key, for Transmitter-1, 2001, by selecting a specific data symbol transition within a group of symbols as it transits a predetermined point within the transmitter. The signal, 2007, is transmitted to Receiver-2, 2003 and the time of arrival of the selected symbol transition is identified, stored by the receiver and used as the basis for calculation of the algorithm coefficients for decoding the masked signal received from Transmitter-1. The symbol stream, Data-2 Out, 2009, is looped back, 2010, via Data-2 In, 2011, Transmitter-2, 2004 and signal 2013, to Receiver-1, 2002, where the selected symbol transition is identified once more and matched to a second accurate instant in time. The symbol round trip delay is then calculated. It is assumed, for this example, that the Transmitter-1 equipment delay, $t_{e1}$, 2006, and Transmitter-2 equipment delay, $t_{e2}$, 2012, are equal, similarly Receiver-1 equipment delay, $r_{e1}$, 2014, is equal to Receiver-2 equipment delay $r_{e2}$, 2008. It is further assumed, for this example, that the go and return free space signal delays, 2007 and 2013, are also equal. In this case the total round trip delay is:

$$d_{tot} = t_{e1} + p_1 + r_{e2} + t_{e2} + p_2 + r_{e1}$$

The link delay, $d_{link}$, i.e. symbol transit time Data-1 In to Data-2 Out, is then:

$$d_{link} = ((p_1 + p_2)/2) - (t_{e1} + r_{e2} + t_{e2} + r_{e1})/2 = d_{tot}/2$$

The symbol transit time $d_{link}$ is calculated, stored and used by Transmitter-1 as an offset time value to be added to the Com Key time instant identified, when calculating the algorithm coefficients for transmission for communication with Receiver-2. For example, if $d_{link}$=5 µS and the common operating time base interval is µS, then the actual time instant used for the Com-Key to generate the waveform coefficients for transmission from Transmitter-1, 2001, to Receiver-2, 2003, will be the instant occurring 5 µS later. The time instant received and stored by Receiver-2, 2003, in the loop-back procedure is used directly as the Com-Key to generate the necessary waveform coefficients to enable communication.

The same Com-Key can then be used for communication in both directions, i.e. from Transmitter-1, 2001, to Receiver-2, 2003, and in the other direction from Transmitter-2, 2004, to Receiver-1, 2002. Separate Com-Keys can be generated for communication in each direction, by repeating the loop-back procedure, starting this time with Transmitter-2, 2004, and looping back via Receiver-1, 2002, and Transmitter-1, 2001. This will provide increased security.

Figure 21:
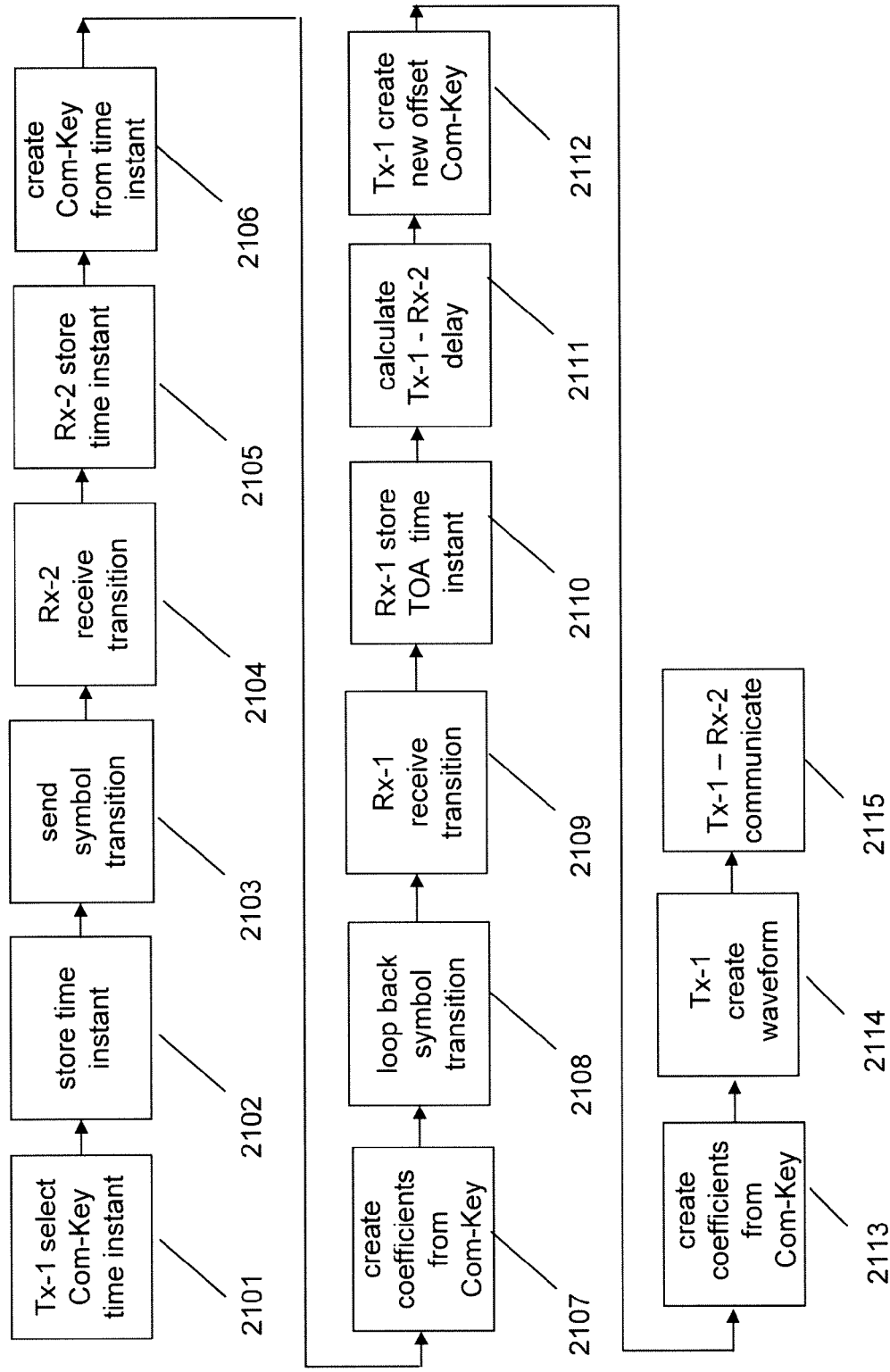
FIG. 21 shows a flowchart of the Com-Key establishment in accordance with an exemplary embodiment of the invention.

FIG. 21 shows a flow chart of the Com-Key establishment described in the foregoing example. The selection of the Com-Key time instant, 2101, and the symbol transition transmission, 2103, are simultaneous events. Storing the time instant, 2102, is not in itself a time sensitive event. Receiver-2 receives the transition, 2104, contained in the sequence of synchronization symbols and as it passes a predetermined point in the receiver processing, the time of occurrence is noted and stored, 2105. This time instant then becomes the Com-Key, 2106, from which the waveform coefficients are created, 2107. The symbol group containing the transition is looped back, 2108, via Transmitter-2 and received by Receiver-2, 2109. As the symbol transition passes a specific point in the receiver process, the time-of-arrival (TOA) is determined, stored 2110, and used to calculate the link delay, $d_{link}$ 2111. A new time instant at Com-Key time instant, 2101 plus the delay $d_{link}$ is created, 2112. The Com-Key is now used to create the necessary waveform coefficients, 2113, and 2114. Because of this offset delaying the final Com-Key time instant by the exact amount of the cumulative transmission delay, both Transmitter-1 and Receiver-2 have identified and may now use the identical time instant as the Com-Key for communication, 2115. The same Com-Key may be used for communication in the reverse direction, as described above.

Figure 22:
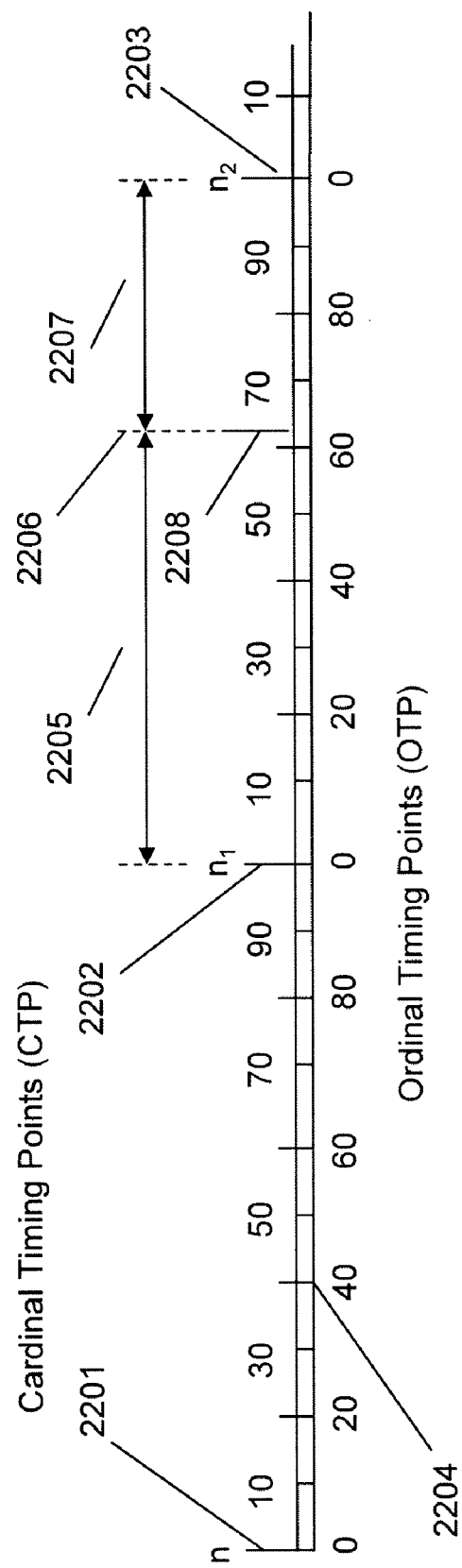
FIG. 22 illustrates an example of one method of setting up Com-Keys from one end of a communications link only

A further example follows of a method of setting Com Keys from one end of the link only, wherein the signal is not looped back. In accordance with FIG. 22, all time is divided into finite periods, commencing at the Com-Root instant shared by all communicants. In this example, time is divided into 100 microsecond (μS) periods. Each 100 microsecond point in time, 2201, 2202 and 2203, is a Cardinal Timing Point (CTP). The time between CTP's is divided into divided again into Ordinal Timing Points (OTP), 1 uS increments in this example. The division of time and subsequent CTP's may be changed to fit the parameters of the communications system and links therein. In this example, a CTP is identified for establishment of a Com-Key for the station initiating communication and the OTP period of 1 uS is used for Com Key timing establishment. The specific data symbol transition, within a group of symbols used for synchronization, as previously described, is selected to be coincident with a CTP. The transmission containing the synchronization symbol will be received at the other end of the radio link and the time of receipt accurately recorded. The time of receipt will be later than the time of transmission by the sum of the amount of the free space signal transit delay plus the processing delays of both the transmitter and the receiver, as described in detail in the foregoing. Providing the total delay is less than 99 uS, the time interval between the time-of arrival and the next CTP can be measured by the receiver to permit calculation of the exact time of transmission. In FIG. 22, CTP 2202, is used for Com-Key origination and hence the time of emission. The signal is received at OTP 2208, 63 uS later by the distant station, 2206. The receiver continuously counts the OTP's between CTP's, thus would immediately recognize that the transmission delay was equal to 63 μS. If the receiver is not programmed to continuously count the OTP's between CTP's, the receiver immediately counts 37 uS 2207, to the next CPT 2203 and subtracts the count from 100 to establish that transmission was made at CTP 2202, 63 uS prior to receipt. The receive and transmit Com-Keys are established to coincide with CTP 2202, at both stations. The transmit and receive timing at the originating end of the link are time synchronized to timing at CTP 2202, and work in real time. Both the receive and transmit timing at the distant station 2206, are negatively offset by 63 uS so that communications in either direction will synchronize. If either or both stations are mobile, relocation will be dynamically compensated by either station by timing offsets, as described later in this document. There are numerous other methods of Com-Key synchronization which will now become apparent, from the foregoing explanation, to those well versed in the art.

If the actual path between the two units is either a reflective or refractive path or other than direct, the electrical signal path length will differ from the actual geographical separation. The calculation will be completed in the same manner as before, as the relative distance, i.e. the actual signal path length is the measurement used to establish the transmission algorithm coefficients. By this method, indirect communications connections can be established using multiple sub-links via relay stations, satellite communication, physical connections or other means. In multi-hop connections, it is not necessary for each sub-link to establish Com-Keys and associated algorithm coefficients, as the relay equipment may operate in a transparent manner, if desired, provided transit delays are constant. Conversely, it may be desirable to establish different Com-Keys for some, or all elements in the end-to-end communications link, for security or other reasons.

Master Timing Oscillator Drift

In cases where GPS or other accurate time synchronization source is either unavailable or denied, equipment frequency control oscillators may drift such that two or more equipments' time may not be reciprocally representative. In such cases, communication synchronization may be attained by use of a CTP, whereby the communication originating equipment's current time-keeping is used for the time reference for synchronization, albeit inaccurate. The essential, when synchronizing for communication, is not accurate time-keeping, in itself, but the ability of both equipments to identify an instant in time and agree to identify it as the same one, regardless of when that may occur.

The precision of a master timing oscillator is commonly specified in terms of maximum frequency deviation in a 24 hour period:

$$\delta = \frac{\Delta \omega}{\omega_0} \text{Hertz/Hertz/day}$$

where: $\omega_o$=nominal oscillator frequency $\Delta\omega$=frequency deviation In the absence of GPS or other accurate reference time signal, the oscillator can drift in accordance with the following expression showing a linear frequency drift. It should be noted, however, that that oscillators do not necessarily continue to drift only in one direction. However, once the oscillator has initially stabilized after activation, frequency drift may be predominantly unidirectional.

$$\Delta\omega(T) = \omega_0 \int_0^T \delta\, dt + \Delta t(0)$$
$$= \omega_0 \delta T + \Delta\omega(0) \text{ Hertz}$$

Time reference error for the same oscillator, on the other hand, may grow quadratically:

$$\Delta t(T) = \int_0^T \frac{\Delta\omega(t)}{\omega_0} dt + \Delta t(0)$$
$$= \int_0^T \delta t\, dt + \int_0^T \frac{\Delta\omega(t)}{\omega_0} + \Delta t(0)$$
$$= \frac{1}{2}\delta T^2 + \frac{\Delta\omega(0)T}{\omega_0} + \Delta t(0)$$

As stated previously, it is necessary to calculate the maximum oscillator drift for any period lacking time reference intervention and to dimension the CTP accordingly. For example, this can be a firmware setting, a field programmable setting, or other, in an embodiment of this invention.

Figure 23:
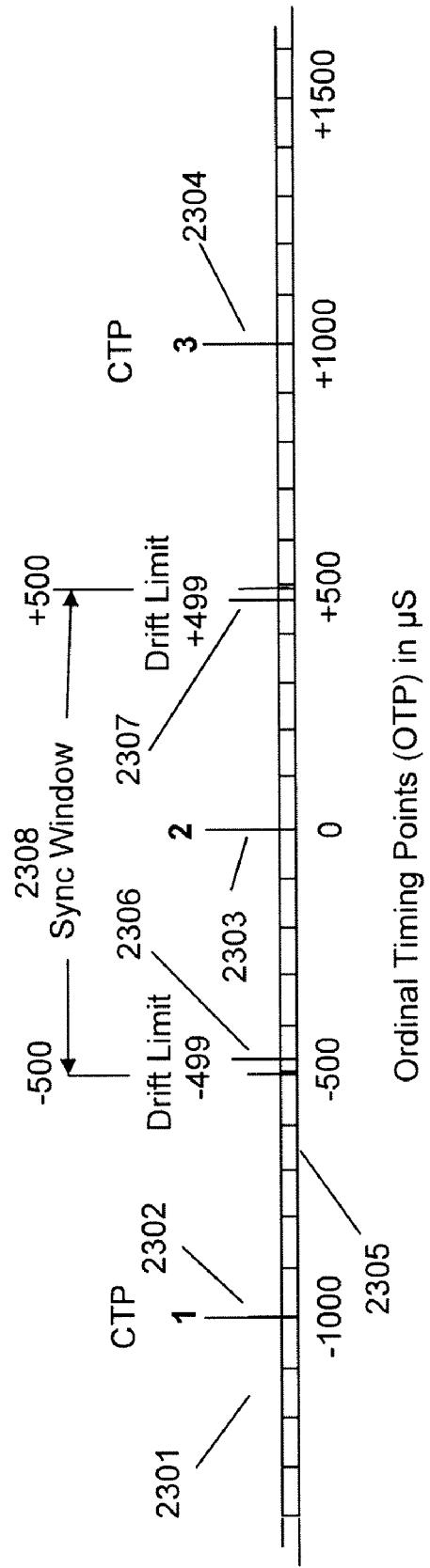
FIG. 23 shows an example of how a synchronization window may be determined for equipment using drifting master timing oscillators and operating in the absence of time-reference synchronization.

FIG. 23 shows an example of how a synchronization window may be determined for equipment operating in the absence of time-reference synchronization. Time, 2301, is divided into 1 μS OTP's, 2305, in this example, in accordance with mutual operational timing, as described in the foregoing. For communication synchronization of two or more units of equipment in the absence of GPS or other time standard corrective intervention, the maximum time deviations are calculated for all units for the maximum period of accurate time synchronization denial. The maximum absolute value of deviation calculated is then used to dimension both positive and negative drift limits, 2306, 2307. A drift value of 499 μS is used in this example. This value, 499 μS is set for both positive and negative drift limits, 2306 and 2307, as preciously stated, as the timing oscillators may drift either positively or negatively. Therefore, if any two oscillators drift in opposite directions, the maximum drift must be applied to embrace the extreme directional drift possibilities of both oscillators. The sync window, 2308, is therefore: 2×absolute maximum drift+2, in OTP units. Insomuch as compensatory timing offsets may be used by communicants instead of direct unit synchronization, in the presence of oscillator drift, it is necessary to allow for elapsed time in respect of TOA transmission signal delays. To allow for this, CTP's should be placed other than at the drift limits+1, i.e. at the sync window limits, 2308. In this example, CTP's, 2302, 2303 and 2304, have been placed at twice the sync window limits.

Figure 24:
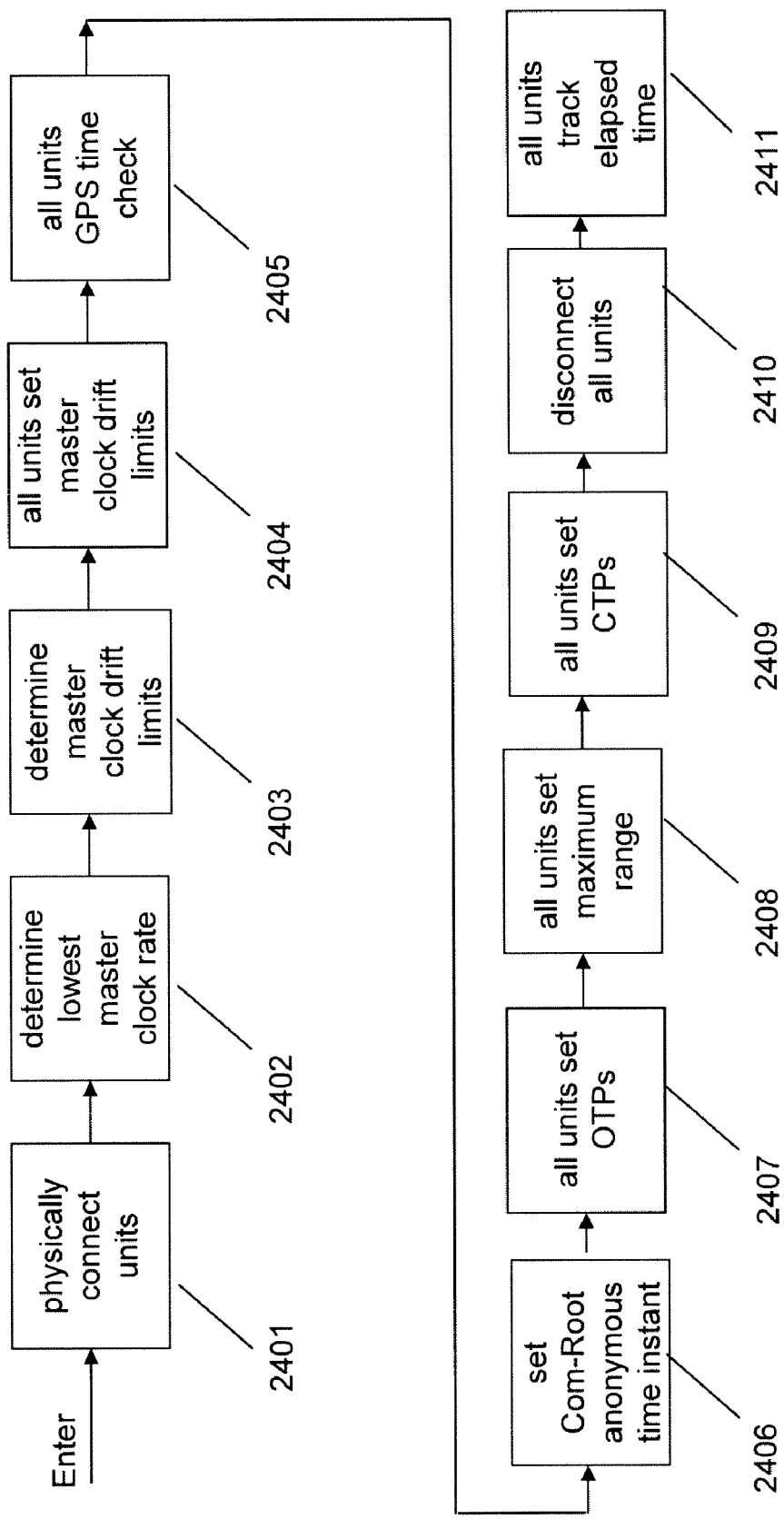
FIG. 24 illustrates a further flow chart showing the basic principle of initialization taking master timing oscillator drift into account.

A further flow chart showing the basic principle of initialization taking master timing oscillator drift is shown in FIG. 24. The equipment units that will communicate with each other are connected, 2401, to an initialization controller, or other means, which steps the units through each phase of initialization in concert. The connection setup is such that all delays between the controller and the equipment response to commands are either the same or compensated for in all units within limits that will ensure that the same time instant is detected and stored by all. The lowest master clock rate, or other limiting timing factor is determined for the units, 2402. This will be the limiting factor to determine the smallest time interval at which new waveform coefficient keys, Com-Keys, may be generated for mutual operation. The master clock rate and, or other information for determining the key generation interval, may be obtained in a number of different ways, such as, but not limited to: they may be stored in equipment firmware, derived algorithmically or entered manually, for example. The maximum drift, 2403, for all equipment is calculated as explained in the foregoing. The data on which these calculations are based may be stored in firmware, as an integral part of the equipment operating system, entered manually or communicated to the equipment and or controller, by other means. The drift limits and synchronization window to be used by all units is determined and set up in all units, 2404. All units access GPS, or other time standard, and synchronize, 2405. Following time synchronization of all units, a set of initialization data symbols is assembled by the controller within which a specific transition will be used by all to set the Com-Root. The controller then transmits the symbol sequence to all units simultaneously. All units will acquire the transition at the same time and register this and record the precise time-of-day as the Com-Root, 2406. As the controller did not predetermine the time instant, the Com-Root generation is truly random and anonymous. Based on the lowest master clock rate, 2402, all time following the Com-Root instant will be divided into OTP's, 2407. The maximum range or distance between any two communicants is entered into the controller, 2408. This may be direct line-of-sight or other indirect distance, including, but not limited to reflective, refractive, multi-hop, satellite or other. The object is to ascertain the TOA delay so that CTP's can be set to take all delays into account. Where significantly different delays are to be encountered, more than one type of CTP's may be used as will be more fully explained, later in this filing. The CTP's are set, 2409, in accordance with the foregoing clock drift and sync window example, where extreme range or distances are not anticipated. All units are now disconnected, 2410, and continue to track elapsed time, 2411.

In cases where GPS or other accurate time synchronization source is either unavailable or denied, equipment frequency control oscillators may drift such that two or more equipments time may not be reciprocally representative. In such cases, communication synchronization may be attained by use of a CPT. The communication originating equipment current time-keeping is used as the immediate time reference for synchronization. Time correction may be made at a later time, using one or the other equipment, or independently, where both equipments have GPS or other time reference access.

In a similar manner to that described previously, in accordance with FIG. 20, a time instant is identified for establishment of a Com Key, for Transmitter-1, 2001, by selecting a specific data symbol transition within a group of symbols as it transits a predetermined point within the transmitter. On this occasion, the time instant selected is coincident with a CTP. The signal, 2007, is transmitted to Receiver-2, 2003 and the time of arrival of the selected symbol transition is identified and stored as a preliminary point to CTP time synchronization; an initial timing adjustment, in that respect, is made by Receiver-2. This interim timing adjustment will now set Receiver-2 timing to lag Transmitter-1 timing by the amount of the transit delay. The signal from Transmitter-1 is looped back via Transmitter-2 to Receiver-1, as previously described. The time delay from Data-1 In to Data-2 Out is calculated as previously detailed. A second group of symbols is transmitted, by Transmitter-1, containing a symbol transition coincident with a second CTP, followed by a second symbol transition separated from the first by the amount of the calculated TOA delay. Receiver-2 corrects its timing by advancing it to reflect the Data-1 In to Data-2 Out TOA delay. Transmitter-1 uses this second transition as the Com-Key as Transmitter-1 and Receiver-2 now have synchronized time references. Receiver-2 then uses the second transition in the latter transmission as the Com-Key.

The timing provided by the foregoing synchronization procedure, while allowing equipment and system synchronization, may not be accurate in respect of the GPS derived timing whereby the Com-Root was established. Timing synchronization of this nature is sufficient to establish and conduct communications on a temporary basis in the absence of an accurate time reference. When an accurate time reference such as GPS is available to all communicating stations, it is then possible to re-establish accurate station timing individually by direct reception of the GPS, or other, timing signal and then perform timing correction and resynchronization in concert in accordance with an operational protocol.

When, however, GPS or other reference signal is not available to all communicants, timing correction may undertaken initially by one station having access to GPS, or other reference signal, direct access to all other communicants, using a CTP plus a second transition relative to the delay associated with each station, as described in the beginning of this section. Where the station with access to GPS or other reference signal is not in direct communication with all other stations, time correction may be undertaken sequentially by correcting a station and using it to correct the timing of other stations with which it is in communication. Timing corrections made by indirect means, as described in the foregoing are logged by the corrected equipment, so that accurate timing can be restored when direct access to a reference signal is available.

Another method of synchronization for communication using a CTP in the case of drifted oscillators, is as follows. The originating equipment transmits the synchronizing data-symbol sequence with the synchronization transition coincident with a CTP in its current timing. With reference to FIG. 23, the CTP, 2303, will always be within its sync window, 2308, but offset from a central position, in accordance with the amount of drift sustained. The receiving communicant will see the transition as the CTP present within its sync window, albeit not coincident with the CTP positioned by its current time-keeping. Because the drift limits, 2306 and 2307, have been set to embrace the extremes, a CTP representing the same time instant will be seen by both units within the limits of the sync window, in all cases, though not coincidentally, in the case of drifted time keeping. The transition time instant will be marked and stored by the receiving equipment, which will then temporarily adjust its timing for the duration of the communication. Both equipments will then either use the CTP time instant to create Com-Keys for communication, as described in the foregoing, or perform further synchronization, as previously described to measure TOA delays and create other Com-Keys. At the cessation of communications, the equipment will return its time keeping to its original state, to remove any additive error, so that the sync window, 2308, with the drift limits, 2306 and 2307, will remain valid for future communication sessions. It will be recognized from the foregoing examples, by those skilled in the art, that when using CTP synchronization, further fine synchronization at the OTP level will be necessary to restrict the operational area of Com-Keys as described later in this document.

The following describes one method of synchronization and generation of valid Com-Keys for communication, in cases where equipment has been completely shut down, such that there has been complete discontinuity in internal time keeping rendering elapsed time interval data unavailable. Super cardinal time points (SCTP), are used to enable manual system entry. SCTP's are set in the same manner as CTP's, except that the elapsed time between them is much greater. For example, for manual reactivation, the SCTP's may be 5, 10, 15 minutes apart, or have even greater separation to sufficiently account for personal time keeping inaccuracies. Smaller divisions may be used such as a few seconds to 2 or 3 minutes where current time is directly obtained from a computer, or other device, with time keeping capability. In all cases it will be necessary to convert any time used to an agreed time zone or international time, i.e. Greenwich Mean Time (GMT) as a common base. The operation of SCTP's is similar to that of CTP's, providing initial synchronization between unit sufficient to generate valid Com-Keys and perform secondary fine synchronization at the OTP level to limit areas of operation, as described in the following section.

Because of the random selection of the Com-Root instant, all time keeping instants after that are equally random, in relative time. Time keeping, with added oscillator drift inaccuracies, while reflecting a gross drift error, will still retain the OTC accuracy for inter-unit communication, when synchronized, as described in the foregoing or by any other method derived from this methodology.

Restricted Reception and Key Validity

Figure 25:
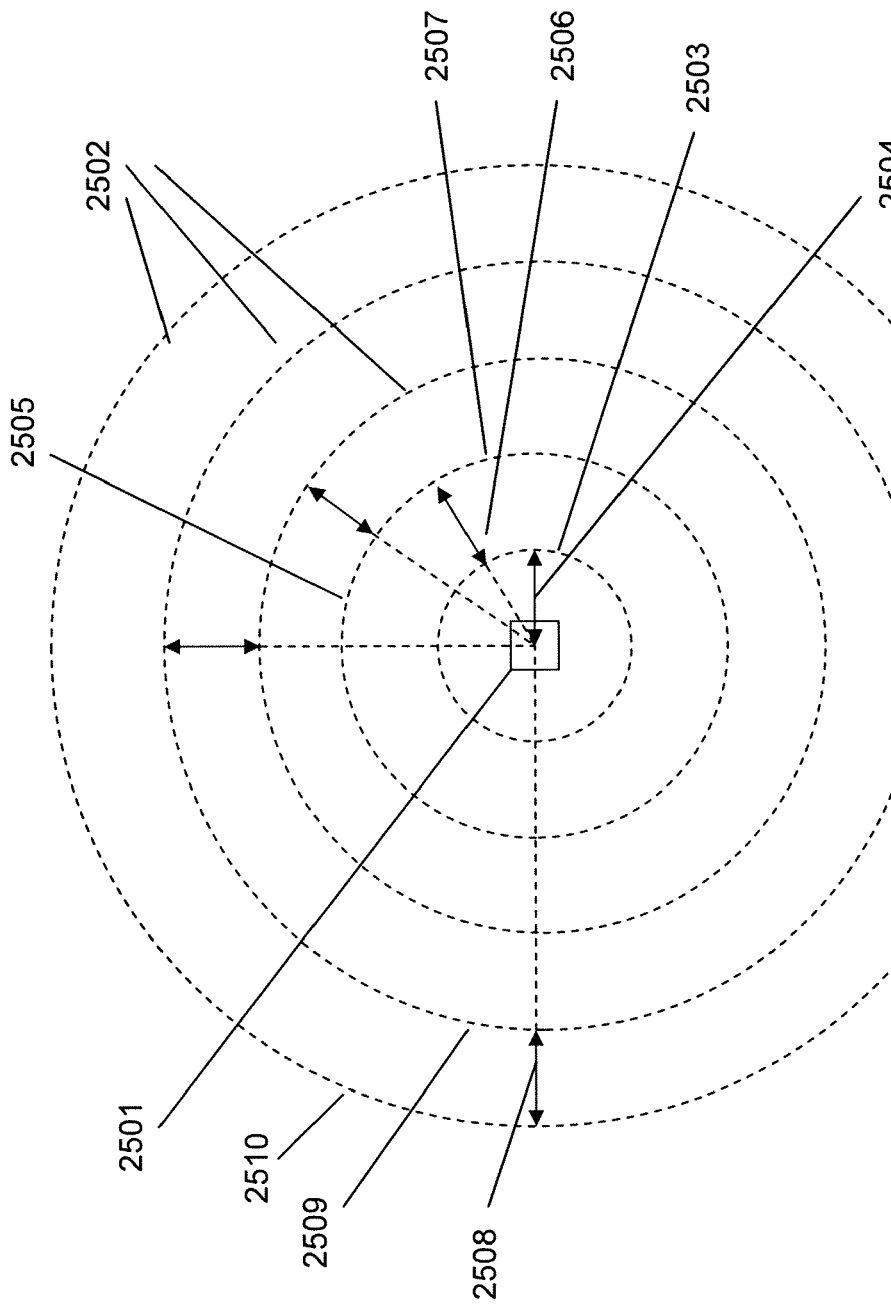
FIG. 25 shows an example of restricted communicant operability zones created by emission from an omni-directional emitter.

The omni-directional emitter, 2501, in FIG. 25 transmits the radio signal in all directions such that the radio waves traveling at approximately $3 \times 10^8$ meters per second will cross each of the concentric circles, 2502, spaced equi-distantly 300 meters apart, at intervals of 1 µS. The signal, 2504, will transit the space bounded by 2503, in a period of 1 µS. Similarly, the signal 2506, will enter the space bounded by the circles 2503 and 2507, after 1 µS and exit after 2 µS, the inter circle transit time being 1 µS. Therefore, if unique Com-Keys referenced to the specific Com-Root instant in time are permitted to be generated at intervals of 1 µS, then a particular Com-Key generated for a receiver located, say 1300 meters from the emitter, 2501, within the area bounded by the concentric rings, 2509 and 2510, at 1200 and 1500 meters respectively, will be valid for the signal received by that receiver for a distance of 1300 meters+200 and −100 meters. Because the Com-Key against which the signal is coded for transmission is based on one specific instant in time and the Com-Key used by the distant receiver is based on the same time instant, delayed relative to the original transmit instant to compensate for the signal delayed TOA, the Com-Key relationship will only be valid for 300 meters following the distance represented by the time offset. As the receiver moves out of the 300 meter validity area, the receiver algorithm timing will no longer coincide with that of the transmitted signal, thus the transmitter and distant receiver will no longer synchronize.

Figure 26:
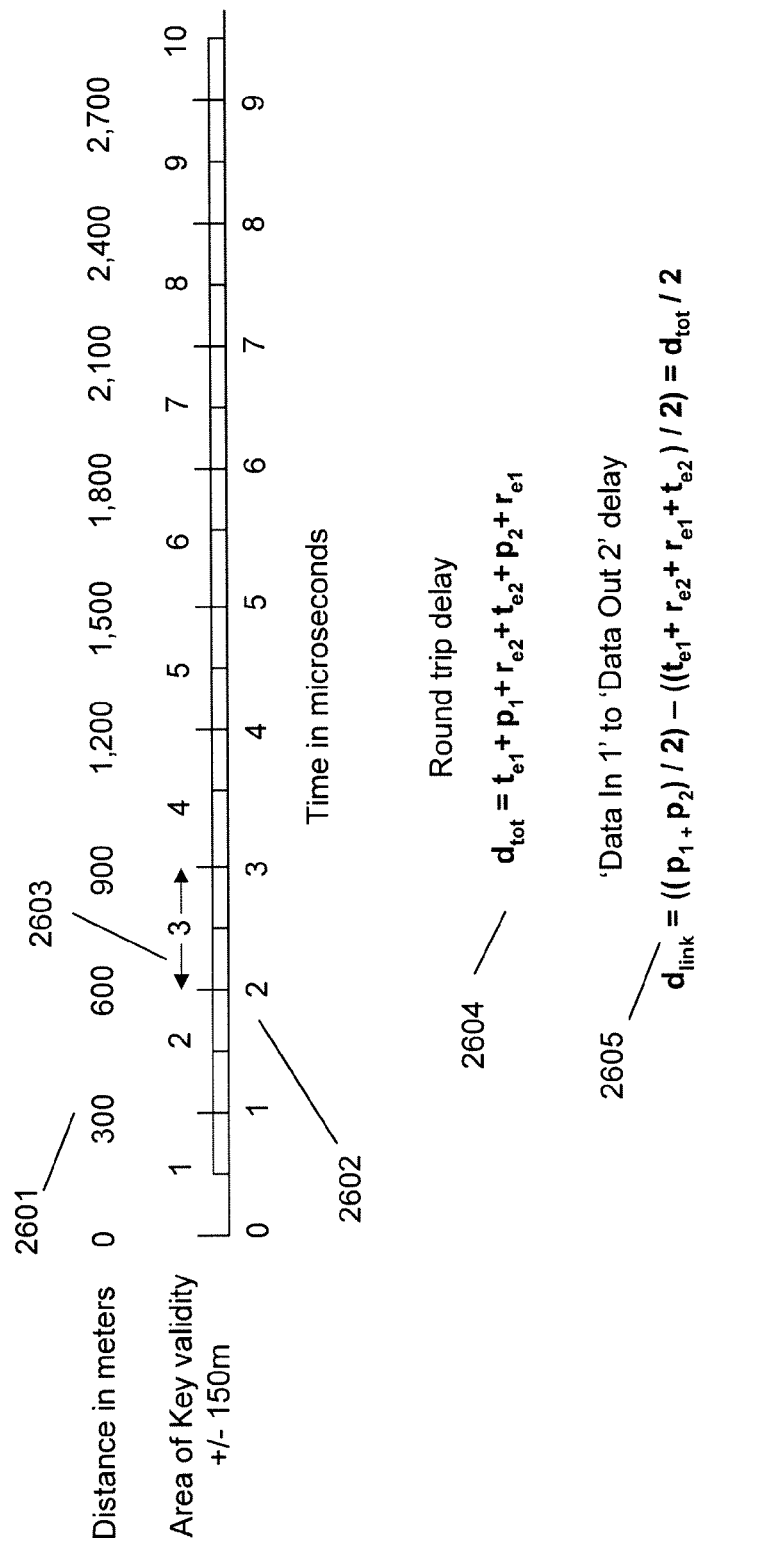
FIG. 26 is a linear representation of areas of Com-Key validity as a function of distance and time for Com-Keys generated at one microsecond intervals.

FIG. 26 is a linear representation of areas of Com-Key validity, 2603, as a function of distance, 2601 and time, 2602, for Com-Keys generated at one microsecond intervals. Different magnitudes of validity can be established by use of various Com-Key generation intervals, e.g. Com-Keys generated at the rate of one every 10 nanoseconds will reduce the concentric circle separation, hence the location validity to 3 meters, conversely, Com Keys generated at the rate of one every 10 microseconds will increase the area of valid operation to 3 Kilometers. The round trip delay signal transit delay, 2604, 2605 and 2606, (see FIG. 20, Data-1-In 2005, to Data-1-Out, 2015) are all reiterated for convenience.

Network Embodiment Examples

Figure 27:
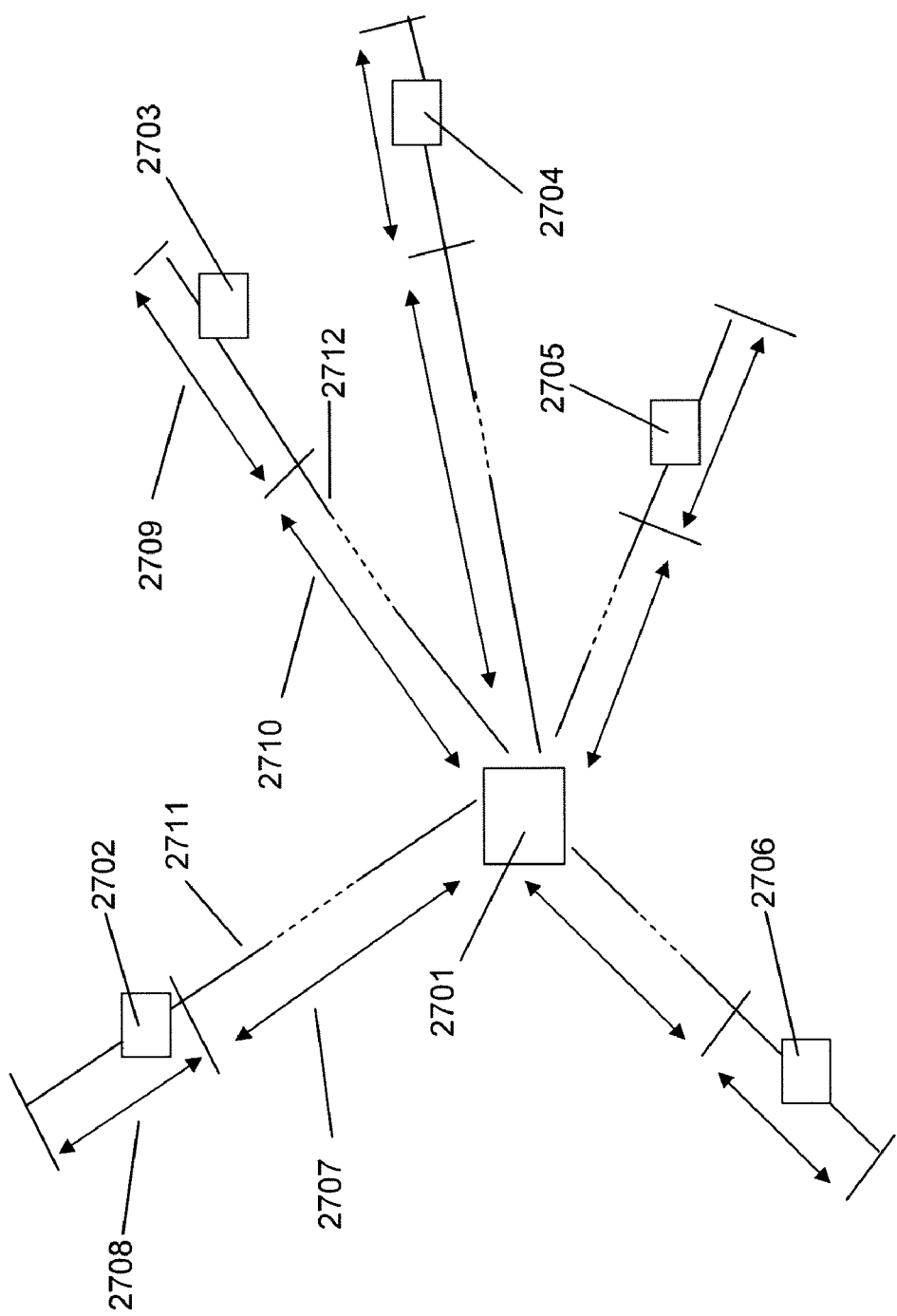
FIG. 27 illustrates an exemplary embodiment with an infrastructure type network comprising a base station, or access point, with remote stations, mobile or fixed.

One example of an embodiment of this invention in FIG. 27 shows an infrastructure type network comprising a base station, or access point, 2701, with remote stations, mobile or fixed, 2702-2706. The station, 2702, is separated from the base station, 2701, by the distance, 2711. This distance is the signal path, electrical distance, which may be direct line-of-sight, or indirect via other route. In this example, we shall assume that all the remote stations are mobile units. Each of the units establishes a Com-Key for communication with and via the base station, 2701. The time and distance relationship between the two entities will result in a defined physical area of operability for each mobile. If the central station, 2701 communicates with all mobiles using an omni-directional antenna, the area of operability associated with each Com-Key will be approximately circular, as described in the foregoing. However, the use of directional and or smart antennas will impose additional limitations on specific areas of operability. For this example, the signal emission pattern from the central station, 2701, is circular. Also, in the example, mobile, 2702, is located at a distance, 2711, from the base station and assuming that the Com-Key for that communications link was generated on the basis of one per microsecond, the resulting 300 meter operating area, 2708, will be held at a distance, 2707. Similarly, a valid operating area, 2709, will be established for remote station 2703, at a distance, 2710. Conversely, it will be seen, therefore, in both cases, the base station will be located in a valid operating area specific to communication with each mobile, 2702 and 2703. The latter valid operating areas are not shown in FIG. 27, for the sake of clarity.

When the Com-Keys are set by stations, 2701 and 2702, each station will offset the timing of the transmit algorithm to time-distance relationship with the other, such that the communicating receivers may use a real-time instant for the receive Com Key, as previously explained. In this example where the remote stations are assumed to be mobile units, it may be necessary from time-to-time to reposition the area of valid operability, when the units move nearer or further away from the base station. Lateral movement will have no effect, in this example, provided the resulting longitudinal distance from the base station does not vary more than that permitted by the established operability area. However, in accordance with FIG. 27, if longitudinal movement exceeds the limits of the valid operating zone and no timing compensation is made, the current Com-Key will become invalid, because of delayed time-of-arrival of the signal at the receiver. In this event, the receiver will lose synchronism with the transmitter and will no longer be able to acquire the signal and retrieve the information. Similarly, the base station will no longer be able to receive signals from the mobile.

Figure 28:
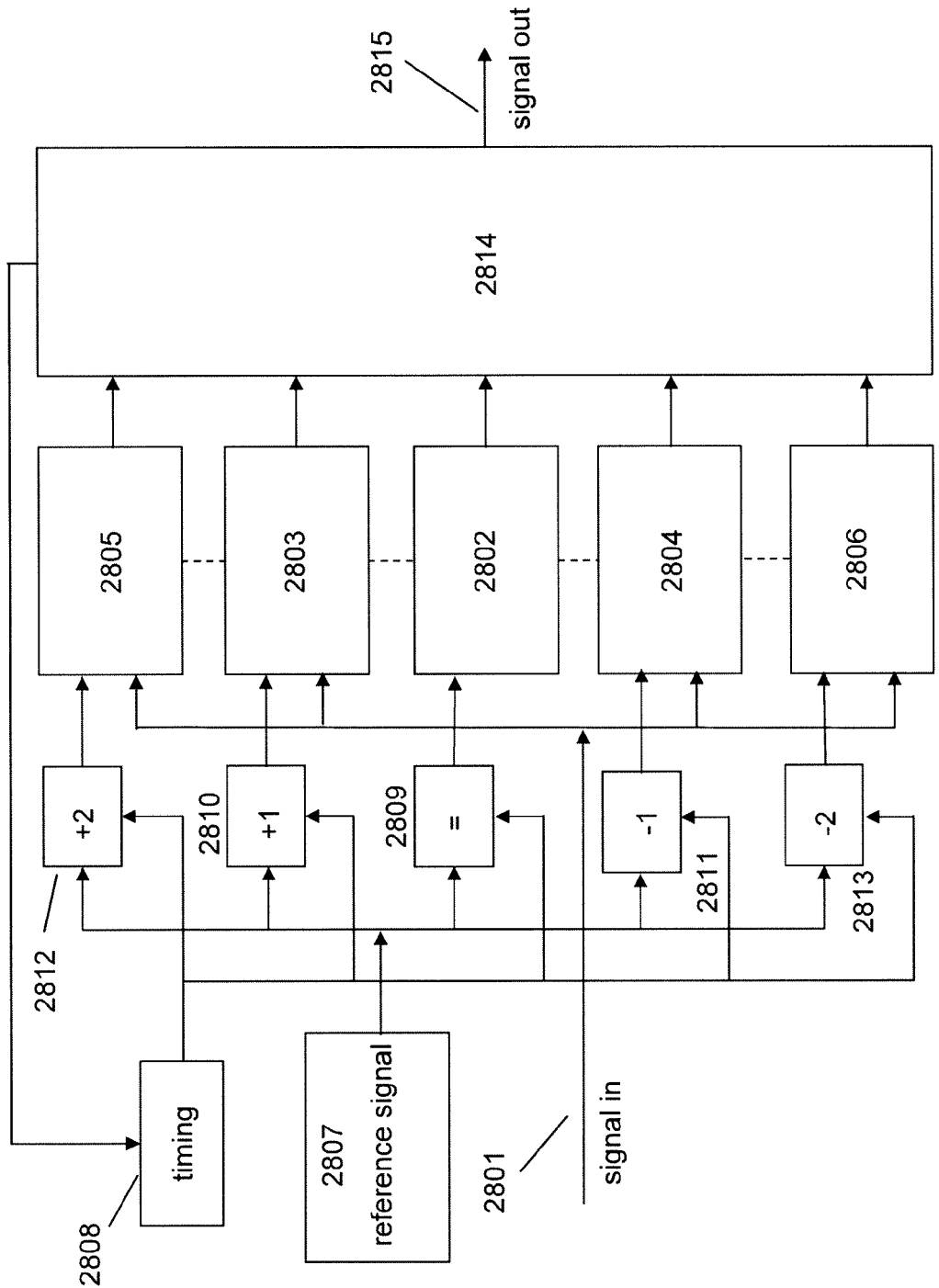
FIG. 28 shows an example of an arrangement wherein the mobile stations are able to move freely and adjust the Com Key timing to compensate for deviations from the initial set-up location.

FIG. 28 shows an example of an arrangement whereby the mobile stations are able to move freely and adjust the Com Keys to compensate for deviations from the initial set-up location. The received signal, 2801, is connected to three or more window detectors, five are shown in the example, 2802-2806. The reference signal, 2807, based on the coefficients provided by the Com-Key and synchronized timing currently in use to the correlator detector 2802. The same reference signal is provided to the other four correlators, 2803-2806, with timing incrementally advanced or retarded from current synchronization via reference signal timing controllers, 2810-2813. Advanced timing is provided by controller, 2810, and further advanced timing is provided by controller, 2812. Retarded timing is provided in similar increments by controllers, 2811, and 2813. The degree of offset timing applied to the signal by each detector would normally depend on the rapidity and frequency of signal time-of-arrival variation experienced or expected in a dynamic system deployment of the technology. For example, as previously explained, if the Com-Keys used for the current example were generated on a one per microsecond basis, thereby relating to possible location deviations of +/−150 meters, the timing offsets used in conjunction with detectors 2803-2806 may be set to differ incrementally by same amount, or controllers, 2810, and 2811, may have lesser incremental deviation from current synchronization timing, than controllers, 2812, and 2813, so that fine tuning may be achieved. As the position of the mobile changes, or other causes result in differing signal time-of-arrival, the correlators, 2803 and 2804, adjacent to the current timing correlator, 2802, will initially detect the change, followed by the outer correlators, 2805, and 2806, except where an instantaneous change of signal path occurs, in which case the latter may detect the change first. The decision element, 2814, of the sub-system in FIG. 28, selects the input from the correlators, 2802-2806 with the best correlation and feeds the information back to the timing controller, 2808. The timing is adjusted as necessary to optimize synchronization with correlator, 2802, whilst retaining signal tracking window provided by correlators, 2803-2806 By this manner, a correctly synchronized signal will always be present at the output 2815. A number of variations of this example are possible rendering various advantages according to the operating conditions encountered including, but not limited to, RAKE receivers, open loop synchronization, closed loop synchronization, matched filter bank estimation, etc. Such variations, realized in either software or hardware, may easily be employed in a dynamically adaptable embodiment of the present invention.

In a system, such as the one depicted in FIG. 27, where there are a number of remote mobile stations communicating via a central base station, it will be unnecessarily burdensome for the base station to continuously track and adjust the Com-Key timing associated with each mobile, although in some circumstances this may be desirable. The mobiles may offset all link timing in both directions, while the base station retains the status quo, in order to keep both mobile and base station Com-Keys operable, regardless of mobile movement and location.

With reference to FIG. 27, in a further example of a network where there are a number of remote mobile stations communicating via a central base station, a single Com-Key may be used for communications with all stations in both directions. In this example, the network utilizes packet communication protocol, such as, but not limited to, Internet Protocol (IP) or ETHERNET. The mobile units, 2702-2706, communicate with the central station, 2701, in short RF bursts, containing a number of information packets. Each packet, in accordance with commonly used commonly used communications practices, would be addressed to the central station, 2701, at the appropriate protocol level. Thus, even though certain mobiles may be physically located in the same Com-Key operational zone, (reference FIG. 25), and decode and demodulate the carrier, the packet(s) would be ignored, in accordance with the addressing protocol. Similarly the, the central station, 2701, using the same Com-Key in the reverse direction, transmits a signal which is received by all mobiles, 2702-2706, which have automatically adjusted their Com-Key timing to achieve synchronization in accordance with their individual locations relative to the central station. The signal is received by all mobiles, the waveform demodulated and the individual packets disregarded by all but the addressee. Conversely, by this method, the central station can effect an "all call" communication with packets bearing the addresses of all mobiles which will simultaneously receive the entire communication.

It will readily be seen, by this method, that conference calls may be made involving part, or all network units, whereby the mobile transmitted packets are relayed to all other mobiles by the central station. Furthermore, those versed in the art will see that that as each communicant drops from a conference call, or disconnects from the network, it is possible to automatically change Com-Keys for remaining communicants, thus providing increased security.

Ad-Hoc Networks

Figure 29:
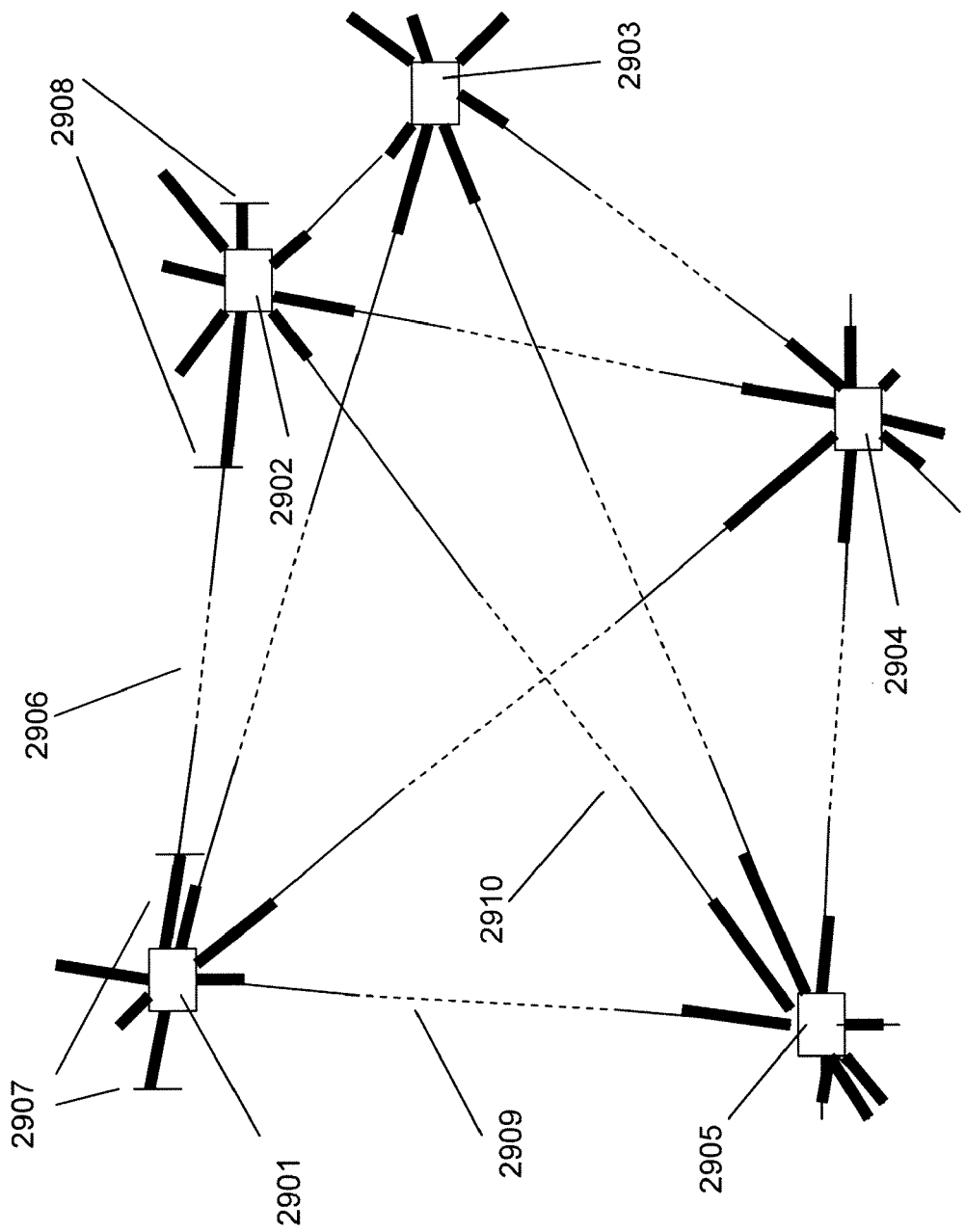
FIG. 29 illustrates an exemplary embodiment in which the technology resulting from the present invention can be used to advantage in ad-hoc networks and other more complex arrangements.

The technology resulting from the present invention can also be used to advantage in ad-hoc networks and other more complex arrangements of this type, as shown in one example of an embodiment in FIG. 29. Five stations, 2901-2905, are all able to communicate directly with each other, using individual Com-Keys. Each communication link Com-Key will create a restricted area of operation for each individual user. Station, 2901, in communication with station, 2902, via link, 2906, will create longitudinal areas of operation within the limits 2907 an 2908, for stations 2901 and 2902 respectively. Any movement of the station which would render the Com Key timing inoperable will be offset by the station in motion, as previously explained. Links with other stations in the network will create similar Com-Key link limitations which must be tracked and dynamically offset the timing to update location related operability.

With reference to the foregoing infrastructure network examples, it will be apparent to those skilled in the art, that, press-to-talk (PTT) networks may also be operated, using a single Com-Key, common to all units, for communication in both directions. In this example, it is necessary for each mobile to temporarily store the timing offset for Com-Key operation for each of the other mobiles. As a particular mobile transmits, all other mobiles automatically select the necessary Com-Key timing offset, relative to location, to demodulate the waveform. As another mobile presses-to-talk, all listening mobiles will select the appropriate Com-Key timing offset to receive and demodulate the waveform.

Furthermore it will also be apparent that simplex, semi-duplex and contention type networks, including IEEE Standard 802.11 communications will also work with the technology, described in connection with this invention. The equipment delays will now include additional protocol delays, which can be predetermined and included in the total delay calculations.

Relative Location of Stations

The time-distance relationship that exists between stations as a result of the radio wave transit time between transmitting and receiving antennas, time of arrival (TOA) is used for dynamic relative station location determination. In a simple two station radio link with unobstructed line-of-sight communication, the most direct path taken by the signal, usually resulting in the strongest received signal, will be approximately: distance in meters=elapsed time in microseconds× 300. As described in the foregoing, any movement of one or both of the stations which either lengthens or shortens the transmission path between the stations will result in a change in signal transit time, thus providing information to calculate a new distance between stations, though if not necessarily sufficient in itself, under most circumstances, to calculate either direction of movement or new relative coordinates. However, with a minimum of four stations, the cumulative information provides sufficient data to calculate both distance and direction of movement; thus providing the relative location of all stations to one another. In a further example with reference to FIG. 29, assuming for the sake of simplicity that the network stations all have unobstructed line-of-sight communication with one another. Once communication has been established between all stations, information is available to facilitate calculation of the distances between them, the azimuth relative to each other, direction and rate of movement, from the free-space transit times over each path and application of elementary trigonometry. Furthermore, if the coordinates of one of the stations is known, the locations of the others may easily be calculated by the same methodology. Relative location, velocity and direction of movement of communicants in a network can be continuously updated automatically by a simple resident program as part of the equipment operating system.

As described in the foregoing, the degree of definition of the distance measurements, hence location, direction and velocity is directly related to the degree of timing refinement available in the equipment. While microsecond accuracy may be the highest available for Com-Root and Com-Key purposes, because of oscillator drift contribution to cumulative time inaccuracy, timing inaccuracies incurred for TOA measurements are non-cumulative and instantaneous relative only to the very brief measurement time period itself. These timing errors can therefore be ignored. Thus higher frequencies, either the fundamental of a much higher frequency master clock oscillator, or a harmonic of the master oscillator. A timing frequency with a period of 10 nanoseconds will enable positioning measurements of +/−1.5 meters, for example and if both the rising and falling edges of the clock signal are used, the measurement refinement is doubled to +/−75 centimeters.

It will be readily apparent to those skilled in the art that the same rules for position and distance determination will apply to networks with other numbers of stations and topologies. As mentioned earlier, GPS timing signals may be used for accurate timing synchronization from time-to-time, similarly, position coordinates may be initially obtained from GPS and subsequent changes of station location and coordinates of new stations joining the network may be calculated as described. It will also be seen that the absence of GPS, either temporarily or permanently, will not affect the relative positioning, velocity and direction calculation capability of this invention. The ability of this invention to fully function with commercial or relatively low stability oscillators in the absence of an accurate time reference in an ad-hoc or infrastructure type modes differentiates it from all prior art. It will also be readily apparent to those skilled in the art, that distances, velocities, directions and coordinates of stations communicating via indirect or multi-link radio paths can be extrapolated from the foregoing with the aid of calculated correction factors applicable to the network parameters and circumstances. The latter extrapolations can be made to include, amongst others, refractive, reflective, fading, Doppler influenced and multi-link signal paths.

While I have described in the foregoing the principles of my invention in connection with specific apparatus, it is to be clearly understood that this description is made only by way of example and not as a limitation to the scope of my invention as set forth in the objects thereof and in the accompanying claims.

What is claimed is:

1. A method of reducing deterministic and cyclostationary features of a direct sequence spread spectrum (DS-SS) transmit signal, comprising:
generating at a transmitter a plurality of independent, unrelated random stochastic sequences with independent distributions;
generating
at the transmitter a DS-SS transmit signal having a plurality of waveform parameters that are independently varied over time in respective accordance with the plurality of independent, unrelated random stochastic sequences, wherein the plurality of waveform parameters that are varied includes at least two of: RF carrier frequency, RF carrier frequency dwell period, data symbol rate, data symbol rate dwell period, chip clock frequency, chip clock frequency dwell period, and a one-time use pseudonoise (PN) spreading sequence; and transmitting the DS-SS transmit signal.

2. The method of claim 1, wherein the plurality of waveform parameters includes the one-time use PN spreading sequence, which is longer than a given communication period.

3. The method of claim 1, wherein the waveform parameters are varied such that the PN spreading sequence is generated with an integer number of chips per data symbol.

4. The method of claim 1, wherein the waveform parameters are varied such that the PN spreading sequence is generated with a non-integer number of chips per data symbol.

5. The method of claim 1, wherein the plurality of waveform parameters includes the chip clock frequency and the chip clock frequency dwell period, wherein the chip clock frequency and the chip clock frequency dwell period are varied independently.

6. The method of claim 5, wherein the plurality of waveform parameters further includes chip clock phase.

7. The method of claim 6, wherein varying the chip clock frequency, the chip clock frequency dwell period, and the chip clock phase coincides with data symbol transition timing.

8. The method of claim 6, wherein varying the chip clock frequency, the chip clock frequency dwell period, and the chip clock phase does not coincide with data symbol transition timing.

9. The method of claim 1, wherein the plurality of waveform parameters includes the data symbol rate.

10. The method of claim 9, wherein the plurality of waveform parameters includes the data symbol rate dwell period.

11. The method of claim 1, wherein the plurality of waveform parameters includes the RF carrier frequency.

12. The method of claim 11, wherein the plurality of waveform parameters includes the RF carrier frequency dwell period.

13. The method of claim 1, wherein the plurality of waveform parameters includes RF carrier amplitude.

14. A communications device capable of reducing deterministic and cyclostationary features of a direct sequence spread spectrum (DS-SS) transmit signal, comprising:

a controller configured to generate a plurality of independent, unrelated random stochastic sequences with independent distributions; and a transmitter configured to generate a DS-SS transmit signal having a plurality of waveform parameters that are independently varied over time in respective accordance with the plurality of independent, unrelated random stochastic sequences, wherein the plurality of waveform parameters that are varied includes at least two of: RF carrier frequency, RF carrier frequency dwell period, data symbol rate, data symbol rate dwell period, chip clock frequency, chip clock frequency dwell period, and a one-time use pseudonoise (PN) spreading sequence.

15. The communications device of claim 14, wherein the plurality of waveform parameters includes the chip clock frequency and the chip clock frequency dwell period, and wherein the transmitter is configured to independently vary the chip clock frequency and the chip clock frequency dwell period.

16. The communications device of claim 14, wherein the plurality of waveform parameters includes the RF carrier frequency and the RF carrier frequency dwell period.

17. A controller readable non-transitory medium encoded with instructions that, when executed by a controller, cause the controller to:

generate a plurality of independent, unrelated random stochastic sequences with independent distributions;

generate a DS-SS transmit signal having a plurality of waveform parameters that are independently varied over time in respective accordance with the plurality of independent, unrelated random stochastic sequences, wherein the plurality of waveform parameters that are varied includes at least two of: RF carrier frequency, RF carrier frequency dwell period, data symbol rate, data symbol rate dwell period, chip clock frequency, chip clock frequency dwell period, and a one-time use pseudonoise (PN) spreading sequence.

18. The controller readable non-transitory medium of claim 17, wherein the instructions that generate the control sequence comprise instructions that cause the controller to independently vary the chip clock frequency and the chip clock frequency dwell period.

19. The controller readable non-transitory medium of claim 17, further encoded with instructions that, when executed by the controller, cause the controller to independently vary the RF carrier frequency and the RF carrier frequency dwell period.

* * * * *